United States Patent [19]

Papadopoulos

[11] Patent Number: 5,053,783

[45] Date of Patent: Oct. 1, 1991

[54] HIGH POWER LOW FREQUENCY COMMUNICATIONS BY IONOSPHERIC MODIFICATION

[76] Inventor: Dennis Papadopoulos, 3705 Raymond St., Chevy Chase, Md. 20815

[21] Appl. No.: 568,891

[22] Filed: Aug. 17, 1990

[51] Int. Cl.$^5$ .......................... H04B 7/00; H01Q 3/22
[52] U.S. Cl. ..................................... 342/367; 342/372
[58] Field of Search ............... 342/367, 353, 371, 372; 455/64

[56] References Cited

U.S. PATENT DOCUMENTS

| | | | |
|---|---|---|---|
| 3,445,844 | 5/1969 | Grossi et al. | 342/367 |
| 3,866,231 | 2/1975 | Kelly | 343/705 |

OTHER PUBLICATIONS

On the Efficient Operation of a Plasma ELF Antenna Driven by Modulation of Ionospheric Currents, 1989 Gordon and Breach, Science Publishers, Inc. printed in Great Britain, pp. 1–17.
Excitation of the Earth-Ionosphere Waveguide by an ELF Source in the Ionosphere, V. K. Tripathi et al., Radio Science, vol. 17, No. 5, pp. 1321–1326, Oct. 1982.
Wireless Generation of ELF/VLF Radiation in the Ionosphere, C. L. Chang et al.
Investigation in the U.S.S.R. of Non-Linear Phenomena in the Ionosphere, V. V. Migulin, . . . of Atmospheric and Terrestrial Physics, vol. 47, No. 12, pp. 1181–1187.
ELF and VLF Radiation from the "Polar Electrojet Antenna", R. Barr et al., Radio Science, vol. 19, No. 4, pp. 1111–1122, Jul.–Aug. 1984.
Generation of Electromagnetic Signals at Combination Frequencies in the Ionosphere, P. P. Belyaev et al., Science-Research Int. of Radiophysics, translated from I. Vysshikh, vol. 30, No. 2, pp. 248–267, Feb. 1987.
Excitation of the Terrestrial Wave Guide by Sources in the Lower Ionosphere, Janis Galejs, Radio Science, vol. 6, No. 1, pp. 41–53, Jan. 1971.
Citation of the Earth-Ionosphere Waveguide by Low-Frequency Sources in an Inhomogeneous Ionosphere, D. S. Kotic et al., pp. 659–663.
Ionospheric Heater Beam Scanning: A Realistic Model of this Mobile Source of ELF/VLF Radiation, R. Barr et al.
Excitation of the Earth-Ionosphere Waveguide by Low-Frequency Ionospheric Sources, N. S. Bellyustin et al., Scientific Int. of Radiophysics, translated from I. Vysshukh, vol. 18, No. 9, pp. 1323–1332, Sep. 1975.
Theory of Generation of ULF Pulsations by Ionospheric Modification Experiments, J. A. Fejer et al., . . . . Atmospheric and Terrestrial Physics, vol. 44, No. 12, pp. 1075–1087.
VLF/ELF Radiation from the Ionospheric Dynamo Current System Modulated by Powerful HF Signals, A. J. Ferraro et al., . . . Atmospheric and Terrestrial Physics, vol. 44, No. 12, pp. 1113–1122.
Measurements of Extremely Low Frequency Signals from Modulation of the Polar Electrojet above Fairbanks, Ak., A. J. Ferraro et al.
The ELF Spectrum of Artificially Modulated D/E-Region Conductivity, H. G. James, . . . Atmospheric and Terrestrial Physics, vol. 47, No. 11, pp. 1129–1142.
Simultaneous Observations of ELF Waves from an Artificially Modulated Auroral Electrojet in Space and on The Grouns, H. G. James et al., Journal of Geophysical Research, vol. 89, No. A3, pp. 1655–1666, Mar. 1, 1984.

Primary Examiner—Gregory C. Issing

[57] ABSTRACT

A method and apparatus for causing interruptions in the ionospheric electrojet to produce ULF/ELF/VLF signals enhances low frequency communications capabilities. A high power transmitter heats ionospheric electrons to enhance the electron-neutron collision rate with an antenna beam that can be modulated in the ELF and VLF frequency ranges. In order to increase efficiency of HF to ELF power conversion by more than two orders of magnitude, a heater is swept over a 35 degree cone on timescales faster than the plasma cooling rate at the heating altitude. Thus, the antenna beam is swept over an area of earth atmosphere to cause heating of ionospheric electrons in regions proximate to each other. The antenna is swept at a rate faster than the cooling rate of the atmosphere and is used to heat regions at an altitude of about 90 km. In addition, an electric field generated by the antenna beam is monitored and the heating region is shaped to optimize a vertical component of the electric field.

15 Claims, 18 Drawing Sheets

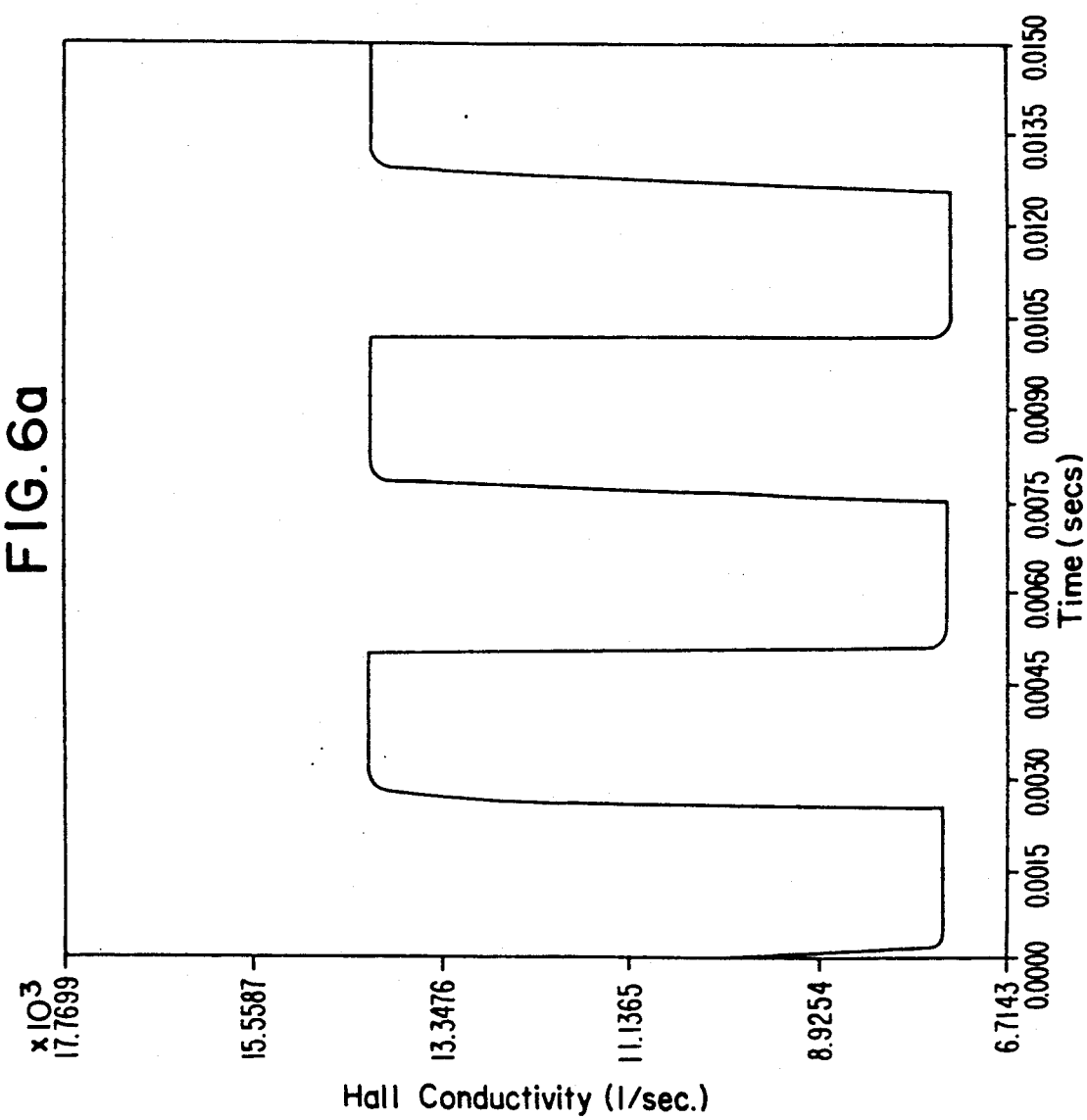

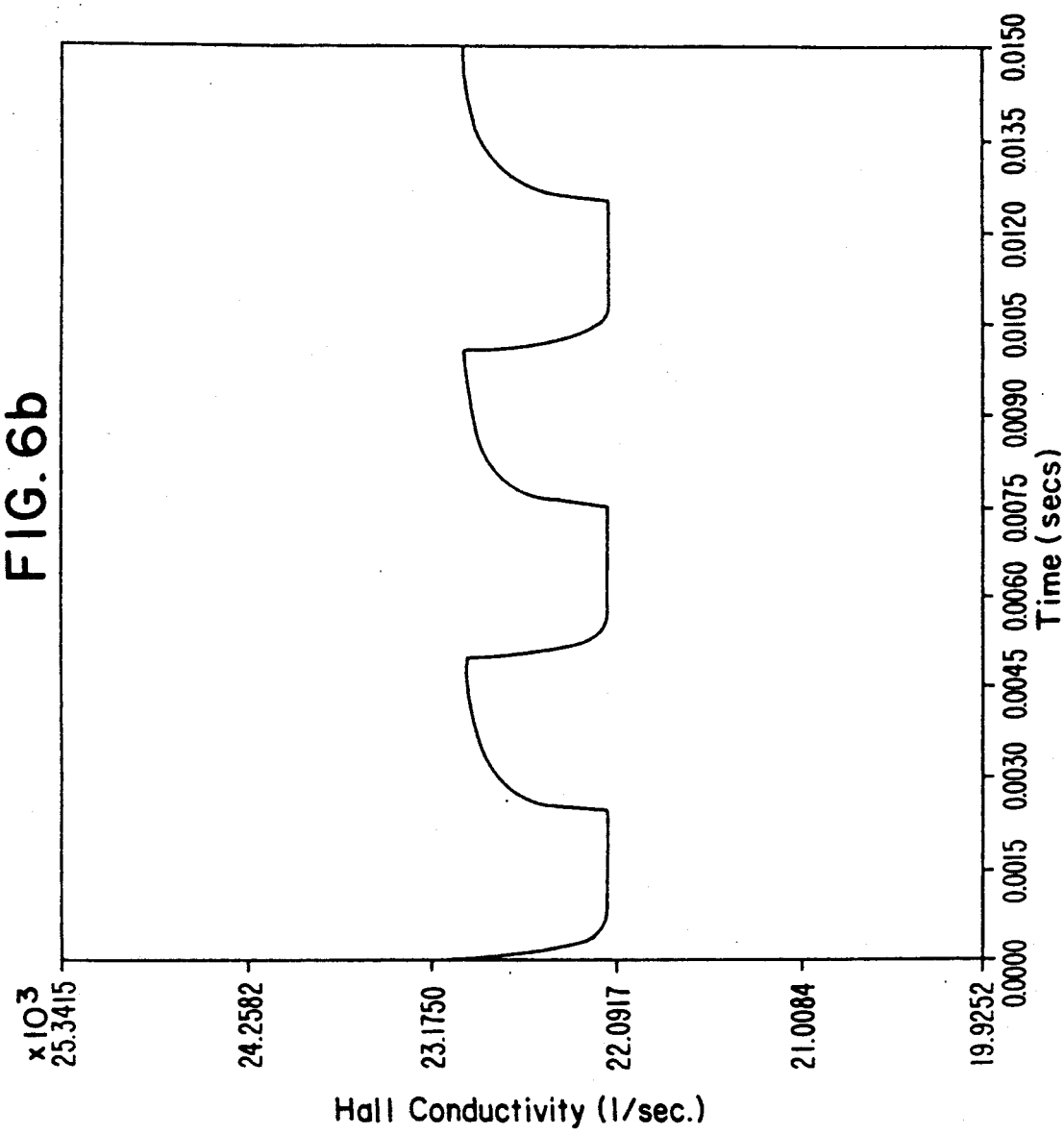

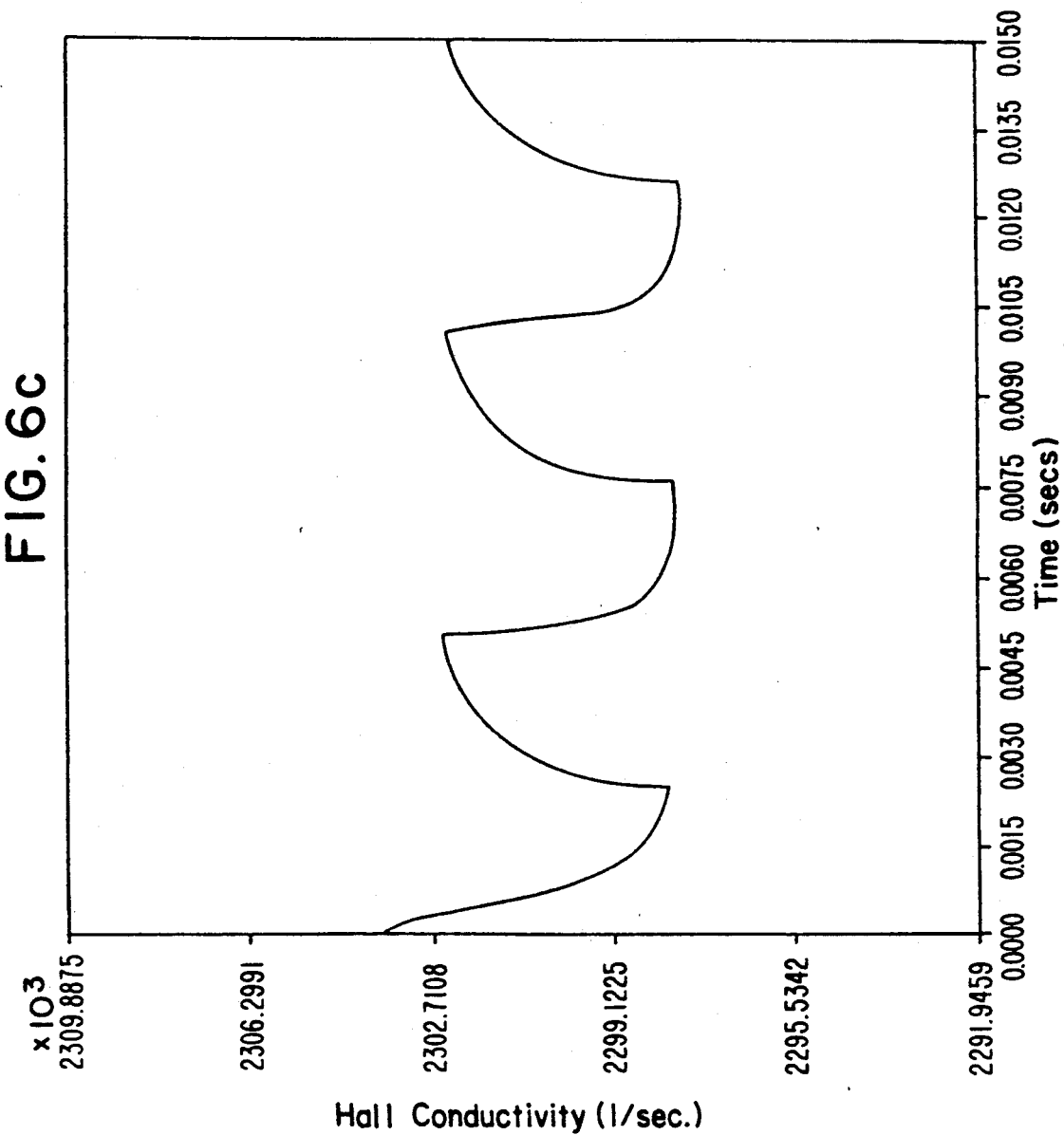

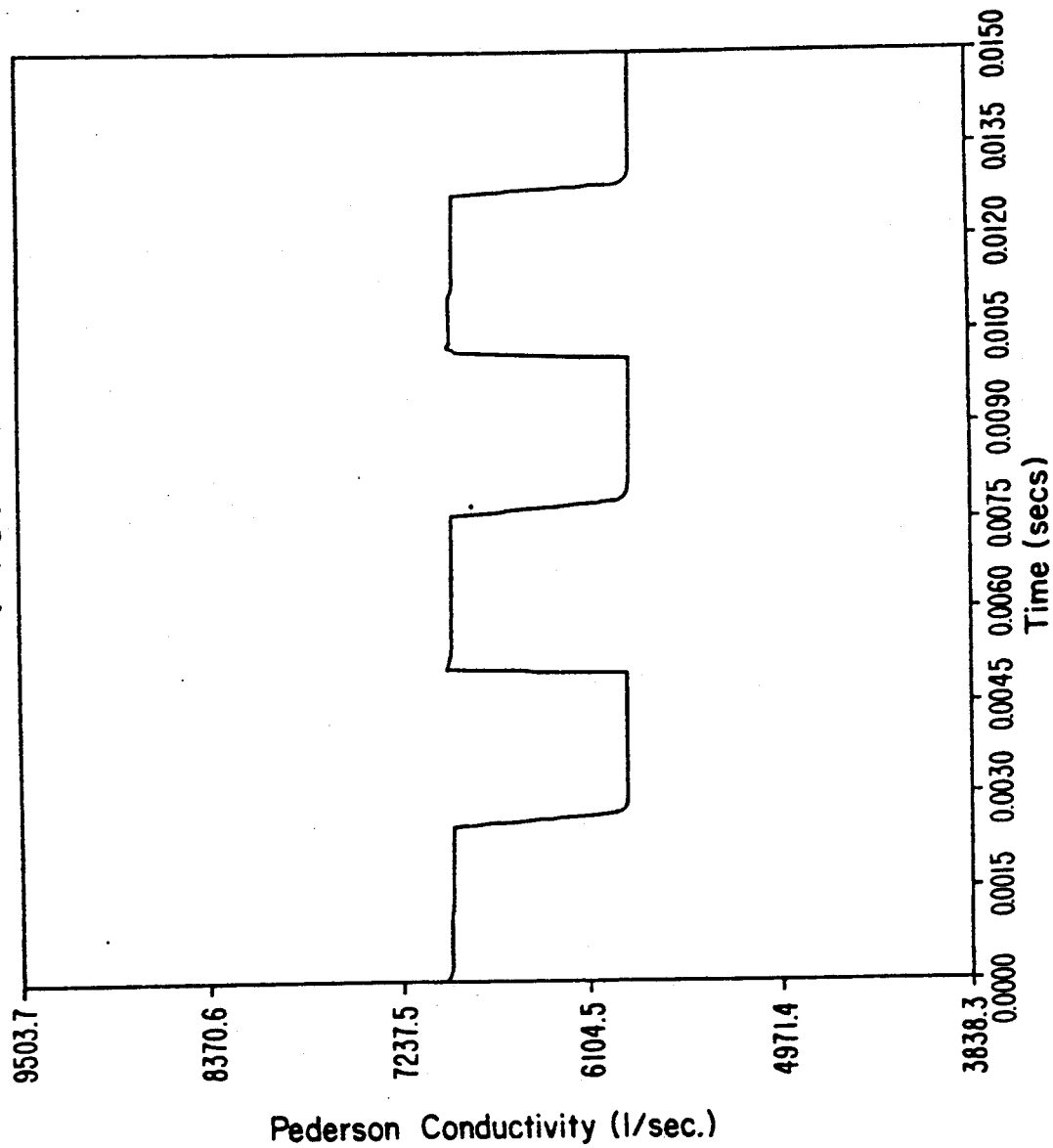

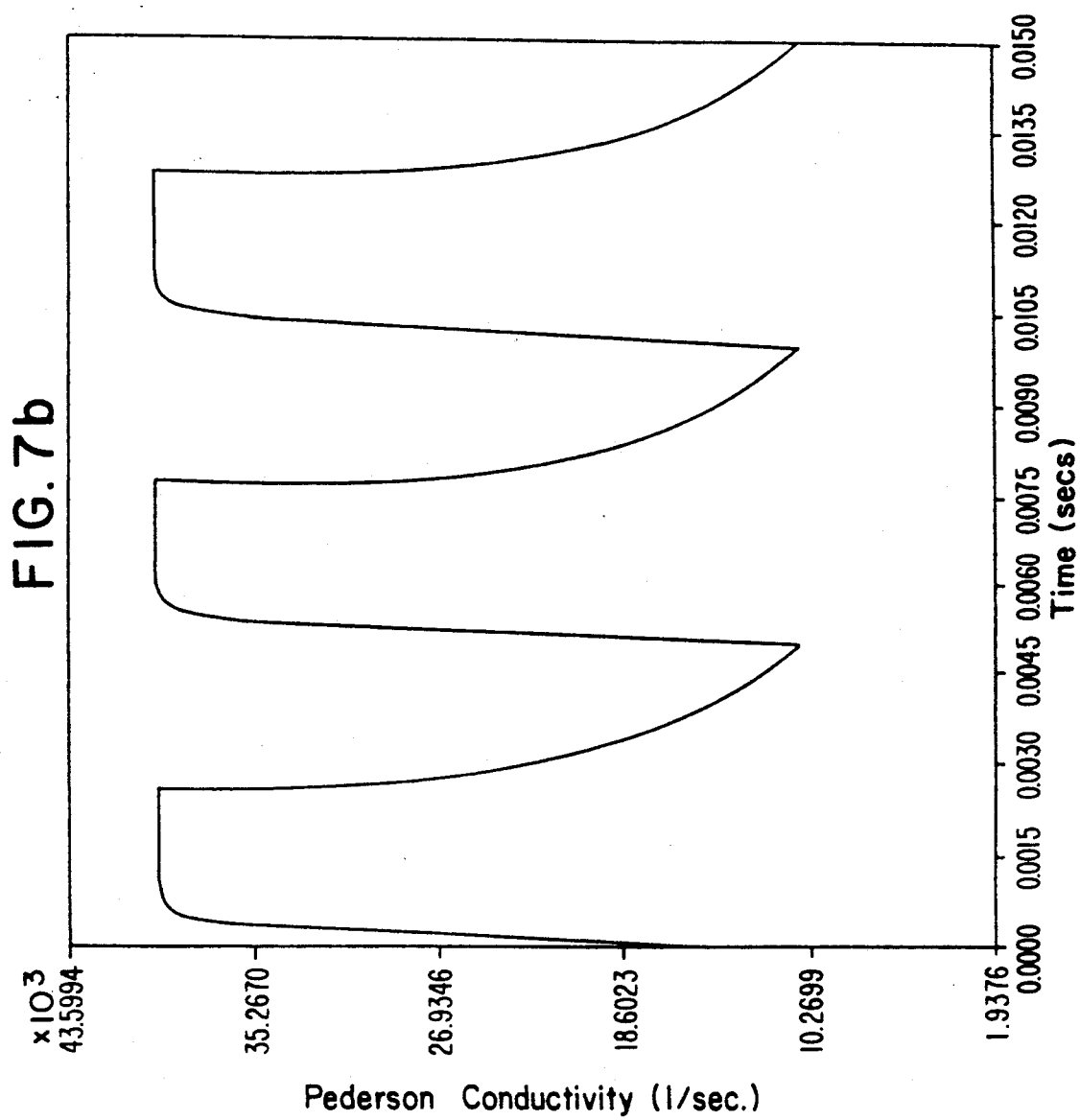

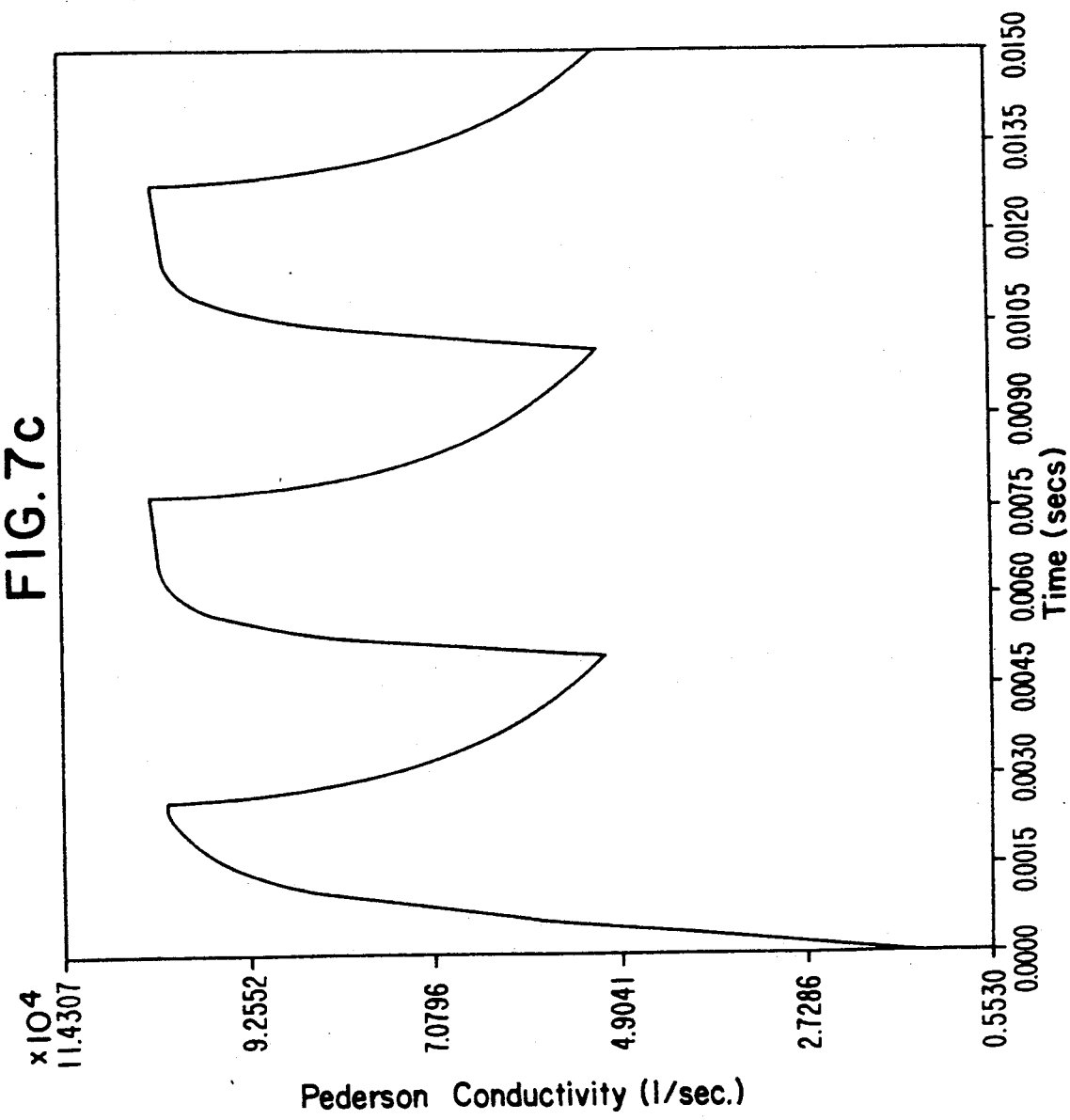

FIG. II

HIGH POWER LOW FREQUENCY COMMUNICATIONS BY IONOSPHERIC MODIFICATION

BACKGROUND OF THE INVENTION

1. Field of the Invention

The present invention is directed to providing low frequency communications using ionospheric modification. In particular, the present invention provides a method and apparatus for causing interruptions in the ionospheric electrojet to produce ULF/ELF/VLF signals.

2. Related Art

Low frequency communication systems can use the long propagation paths of low frequency waves (on the order of 1 Hz to 1 kHz) inside the earth-ionospheric wave guide to convey information. For example, ELF wavelengths are comparable to the radius of the earth, and horizontal propagation of ELF waves is equivalent to the propagation of a series of earth-ionosphere eigenmodes which have very low spatial attenuation. ELF waves also feature very low absorption in sea water. A 100Hz wave can typically penetrate 100 meters below the ocean surface. As a result, ELF waves have a practical utility in allowing communication with submerged submarines. ELF waves can also penetrate the earth's surface and be used in geophysical exploration.

The conventional approach to ELF wave excitation, as pursued in the late 1960's and early 1970's, employed large ground based antennas, typically on the order of $10^4$ km$^2$. The ground based antenna approach suffers several drawbacks, including the large physical area required for the antenna array, the expense of constructing and maintaining a large facility, and relatively low efficiency. For example, one Navy ELF transmitter uses over 2 MW of ground power to produce only 2W of radiated power, resulting in an efficiency of only $10^{-6}$. Other alternatives which have been proposed include ELF generation by satellite borne antennas and the use of high frequency ground transmitters using the ionosphere as an active medium.

Generating ELF waves by utilizing the ionosphere as an active medium is of particular interest. This technique provides frequency agility and avoids many of the economic drawbacks associated with large and inefficient ground based facilities. Generation of ELF waves by modulating ionospheric currents has been confirmed for both the equatorial and the auroral electrojet in experiments conducted in the USSR (Migulin and Gurevich 1985, Belyaev et al. 1987), the MAX-Planck Tromso facility in Norway (Stubbe et al. 1982, Barr and Stubbe 1984, James et al. 1988), and in the United States (Ferraro et al. 1982, Ferraro 1988, Ferraro et al. 1988).

Electrojet current modulation can be accomplished by using a high power ground transmitter which heats ionospheric electrons locally, to enhance the electron-neutron collision rate. This yields a modified ionospheric region with plasma conductivities (Hall, Pedersen and Parallel) substantially different than the surrounding region which impedes the electroject and induces a local current perturbation. If the heating process is carried out in an intermittent manner with a pulse period in the ELF range, the current perturbation around the heated region will radiate at the ELF frequency in a manner similar to an oscillating dipole. Thus, a "virtual" antenna is created inside the ionosphere. This virtual antenna radiates at the expense of the free energy of the natural electrojet current system.

Most of the experiments performed in this area have used HF frequencies in the range of 2-5 MHz, while the power density at the interaction region varied from between $10^{-4}$–$10^{-3}$ W/m$^2$. The most exhaustive studies were performed at the Max-Planck Tromso facility The results here were generally consistent with results produced at other facilities, although the precise values of the detected field amplitudes depend on local conditions, characteristics of the HF facility and other specific factors While proving the underlying fundamental principles were sound, experiments to date indicated that the efficiency of such a system would be limited to about $10^{-8}$, or less than that of established ground based systems, such as the Navy system mentioned above. As further discussed below, these previous attempts to utilize electrojet antennas failed to match ionospheric plasma response to antenna operation, resulting in such low efficiencies.

SUMMARY OF THE INVENTION

In view of the above limitations of the related art, it is an object of the invention to achieve a higher efficiency system for transmitting low frequency waves using the electrojet.

It is still another object of the invention to match performance of the HF antenna to the ionospheric plasma response and radiated ELF frequency.

It is a still further object of the invention to direct an antenna beam at a region of earth atmosphere thereby causing heating of ionospheric electrons in a corresponding region of earth atmosphere and sweep the antenna beam to another region of earth atmosphere to cause heating of ionospheric electrons in the other region.

It is a further object of the invention to heat ionospheric electrons at a fixed altitude determined by the frequency of the antenna beam.

It is still another object of the invention to direct the heating to an altitude of about 90 km.

It is still another object of the invention to monitor an electric field generated by the antenna beam.

It is a further object of the invention to shape the ionospheric heating region to optimize a vertical component of the monitored electric field.

The above objects of the invention and others are carried out by a method and apparatus for producing ELF waves by ionospheric modulation having a much greater efficiency than previous ionospheric and conventional methods. The present invention is based on the recognition that the efficiency of HF to ELF power conversion can be increased by more than two orders of magnitude if the heater is swept over a 35 degree cone on timescales faster than the plasma cooling rate at the heating altitude. Further efficiencies can be realized by providing localized heating at an altitude between 90-100 km where the dominant modulated current is the Pedersen current. Finally, further improvement is achieved by monitoring the electric field and adjusting the heating region to optimize the coupling of the electric field to the earth-ionosphere waveguide.

BRIEF DESCRIPTION OF THE DRAWINGS

The above objects of the invention are achieved by the embodiments described herein in which:

FIGS. 6a-6c show the Hall conductivity modifications for the conditions in FIGS. 5a-5c respectively.

FIGS. 7a-7c show the Pedersen conductivity modifications for the conditions in FIGS. 5a-5c respectively;

FIG. 10a shows ionospheric electron temperatures with all power delivered to an area corresponding to a half beam width of 7.5°;

FIGS. 10b-10d show the power delivered over a wider area having many spots; R is the enhancement of ELF power over FIG. 10a.

DETAILED DESCRIPTION OF THE PREFERRED EMBODIMENTS

The ionosphere is an active, strongly nonlinear plasma medium containing free energy sources in the form of ambient currents and density gradients maintained by the input of the solar energy and the earth's rotation. Tapping these free energy sources is a long-time goal of space plasma physics. The best known non-linear effect caused by the ionospheric plasma is the so-called "Luxemburg Effect" in which an amplitude modulated high power HF wave propagating through the ionosphere causes modulation transfer (cross modulation) to other waves passing through the same ionospheric medium. The ionospheric plasma thus acts as a non-linear frequency transformer.

Figure 1:
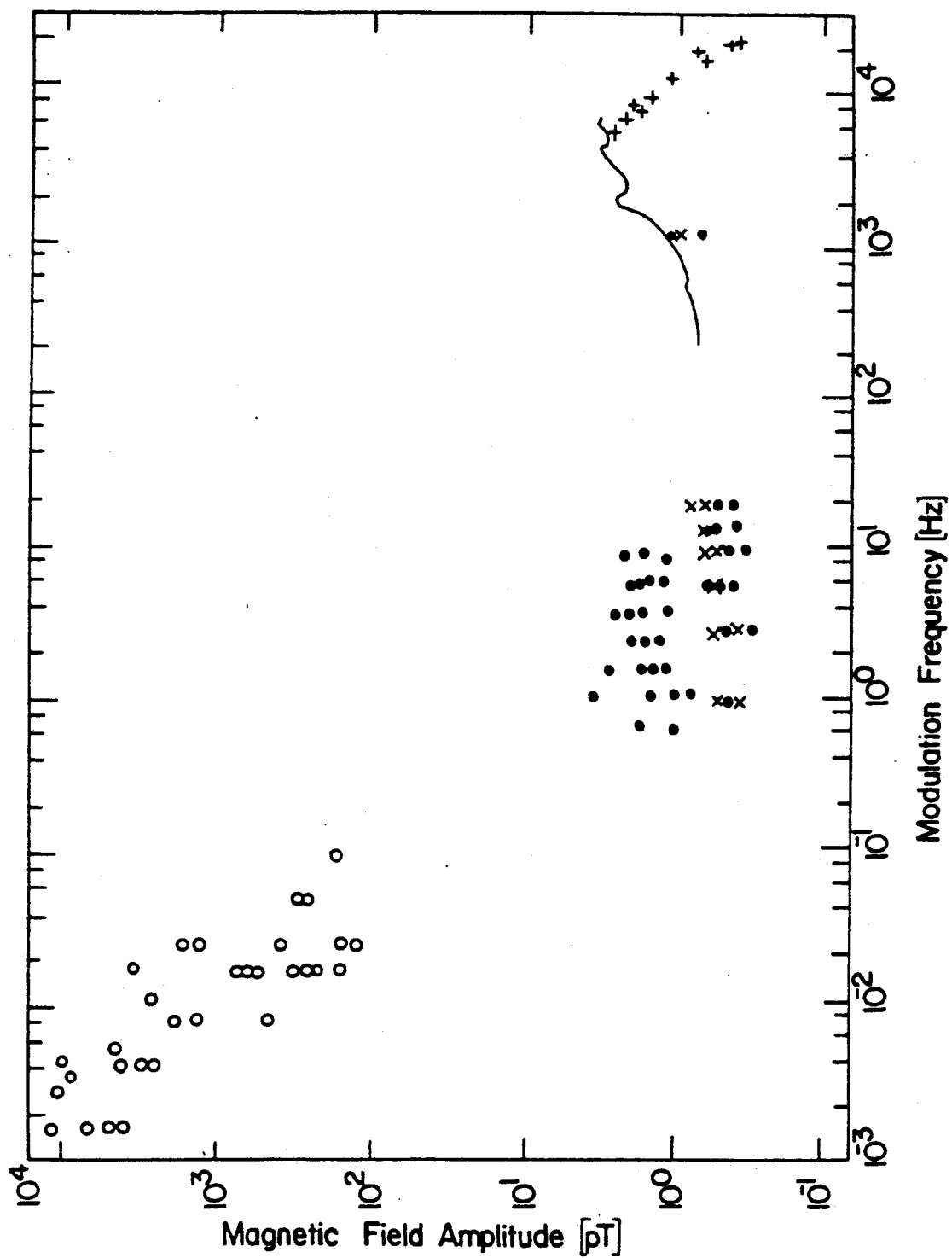
FIG. 1 shows a typical magnetic field amplitude as a function of frequency measured on the ground at the Max-Planck Tromso "Heater" facility.

Manifestations of the frequency transforming properties of the ionosphere have been confirmed in a series of experiments conducted during the past decade in the U.S., the U.S.S.R. and Norway. The majority of the experiments demonstrated downconversion of HF power in the 1.5-10 MHz region to the VLF-ELF-ULF range (i.e., 10 kHz-1 mHz). The most comprehensive experiments were performed with the "heater" facility at Tromso, Norway operated by the Max Planck Institute. A summary of the ground measurements of the magnetic field amplitude vs. frequency are shown in FIG. 1. An analysis of the "Heater" results gave conversion efficiencies that varied from $10^{-5}$ at a frequency of 2 kHz to $10^{-8}$ 200 Hz. Due to mechanical resonances of their L, diesel generators, data were not taken in the 20-200 Hz region. As seen from FIG. 1, the field amplitude of the 1-20 Hz waves is comparable to the 200 Hz amplitude. The technique of generating low frequency ($\Omega$) waves from HF waves has been called the "Combination Frequency Signal" (CFS) in the U.S.S.R. literature because the low frequency could be selected by using two carrier HF waves with frequencies, $\omega_1$, $\omega_2$ such that $\omega_1-\omega_2=\Omega$ instead of amplitude modulating the HF carrier. The "Heater" experimenters have called the technique the "Polar Electrojet" (PEJ) antenna.

PEJ antennae have been studied systematically over the last ten years and a quantitative understanding of their physical principles, well validated by experiments, has emerged. The free energy source for their operation is the auroral current system. This system is powered by the flow of the solar wind plasma intercepting the polar magnetic field lines. The resultant emf drives currents along the magnetic field lines of the collisionless magnetospheric plasma (Birkeland currents) which close across the magnetic field lines at an altitude between 70 and 100 km in the collision dominated ionospheric plasma. This DC cross field current is called the auroral electrojet current and is confined around the auroral oval. The auroral oval is a ring around the geomagnetic pole, where the ionospheric conductivity is enhanced by the continuous precipitation of keV electrons. The total power of the electrojet current system is $10^5$ MW and its ohmic dissipation results in an increase of the ionospheric temperature by 100 K. The electrojet current $I_0$ is driven by an ionospheric electric field $E_0$ which results from mapping along the magnetic field lines of the emf induced by the solar wind. The average observed value of $E_0$ is about 25 mV/m, although at times it can reach 150 mV/m or be as low as 5-10 mV/m.

The PEJ antenna operates on the following principle. An HF transmitter which is amplitude modulated at a frequency $\Omega$ or, equivalently, two HF transmitters with frequencies $\omega_1-\omega_2=\Omega$ are incident on the lower ionosphere. Absorption of the HF power by the electrons that carry the electrojet currents results in local heating and modifies the temperature dependent value of the local conductivity. For values of $\Omega$ such that $\Omega\tau_C<<1$, where $\tau_C$ is the electron cooling time, the conductivity modulation $\Delta\sigma$ reflects the shape of the envelope imposed by the heater modulation (for the lower ionosphere $\tau_C\approx 0.01$-0.2ms). The associated variation of the current density is $\Delta j$, given by $\Delta J=\Delta\tau\cdot E_0$. This constitutes a primary source of modified current. For low frequencies the total current is divergence free. As a result, a secondary current is set up consistent with the divergence free condition. The total current consists of the current $I_1$ flowing through the heated volume a current $I_2$ flowing around the modified volume, and a field aligned current $I_3$ flowing through the magnetosphere to the conjugate ionosphere. The equivalent circuit shown in FIG. 2 was proposed by Stubbe et al. to describe the radiative loop. It is easy to see that for the ELF range (10Hz-5kHz) the radiating current is essentially due to $I_1$ and only the $R_1$, $L_1$ part of the circuit is active. For the ULF part (1-10 Hz) $I_2$ becomes relevant. For our frequency range, the field aligned currents do not respond ($L_M\approx 50H$) and the radiating currents are essentially due to the locally modified currents.

Relating the amplitude of the ELF waves on the ground to the extent and characteristics of the modified region in the ionosphere and to the design characteristics of the HF transmitter is a complex problem. Aspects of the problem have been examined by many authors (Kotik and Trakhtengerts 1975, Belustin et al 1977, Tripathi et al 1982, Fejer and Krenzien 1982, Barr and Stubbe 1984a,b). It involves the following series of sequential steps. Based on the transmitter characteristics (power, gain, H.F. frequency and modulation frequency) and the applicable model of the ambient ionosphere, the conductivity modulation is first computed as a function of altitude. This allows for the calculation of the modulated current altitude profile, for any specified ambient ionospheric electric field (assumed or measured). This calculation involves computing the primary current, the polarization currents required to set up quasineutrality, and the induction currents caused by the time dependence of the magnetic field. Finally, from the modulated current profile the excitation and propagation of the ULF/ELF/VLF waves in the earth's ionospheric waveguide can be computed by using either the extended source technique (Tripathi et al, 1982) or with an equivalent ULF/ELF/VLF moment in the ionospheric reciprocity principle (Galejs 1968, 1971; Barr and Stubbe 1984a,b).

Within the experimental and theoretical uncertainties our purpose can be accomplished by starting from the current experimental results in the frequency range of 50–500 Hz and analyzing them under the assumption that the power generated is proportional to the square of the dipole moment $$M = IL \quad (1)$$

where I is the total modulated current contributing to the ELF field on the ground and L is the linear size of the modulated region. All other factors entering the efficiency calculation can taken from the available experimental data base. The measurements and analysis of the Tromso results (Barr and Stubbe 1984a) can be used as a baseline input. These results are in general agreement to the ones reported from HIPAS (Ferraro et al 1988). The range of 50–500 Hz has been selected in order to avoid effects associated with waveguide resonances which arise for frequencies above 1 kHz.

The experimental results indicate that when the heating transmitter is operated at a power level of 150 MW ERP (effective radiated power), the amplitude of the ELF field measured on the ground is 100 IV/m or 1 pT. This corresponds to about 10–100 mW of radiated ELF power in the 200–500 Hz range (Barr and Stubbe 1984a). The equivalent radiating horizontal dipole at 75–80 km altitude in the ionosphere is IL $\approx 3-5\times 10^4$ A-m which corresponds to an equivalent ground based electric vertical dipole with IL $\approx 2-4\times 10^3$ A-m. The polarization is consistent with predominance of Hall current modulation. Computations based on a fluid model indicate that for an assumed ambient ionospheric electric field $E_0 = 25$ mV/m the peak values of the modulated current density are in the range of $10^{-8}$ A/m² and are located between 75–80km in altitude. The effective horizontal radiated current moment M can be estimated by height integration as $$M = IL = \Delta j \Delta z L^2 = \Delta \sigma \Delta z E_0 L^2 \quad (2)$$

where $\Delta j$ is the modulated current density, $\Delta z$ is the extent of the effective radiating layer in altitude (or the vertical extent of the effective radiating layer) and $\Delta \sigma$ is the modulated conductivity. Since, for the high altitude case $$I = \Delta j \Delta Z L = E_0 \Delta \tau \Delta Z L \quad (3)$$

This result (equation 2) is also obtained by combining equations 1 and 3.

The value of the ELF field on the ground depends on the value of M and the efficiency at which the field couples to the earth ionosphere waveguide (excitation factor). For the ELF range, the excitation factor varies as $1/\Omega$. The ELF power on the ground would then be $$P_{ELF} \sim (E_0 \Delta Z)^2 \epsilon^2(\Omega) \Delta \epsilon^2 L^4, \quad (4)$$

where $\epsilon(\Omega)$ is the waveguide excitation factor. The HF to ELF conversion efficiency $\eta$ is then given by $$\eta(\Omega) = \frac{P_{ELF}}{P_{HF}} \quad (5)$$
$$\approx (E_0 \Delta z)^2 \epsilon^2(\Omega) \frac{\Delta \epsilon^2 L^4}{P_{HF}}$$

where $P_{HF}$ is the average ground based HF power. For the case analyzed by Barr and Stubbe, a square heating pulse was used. The value of $P_{HF}$ was 1 MW and at the ELF generation region L $\approx$ 10km corresponding to a heater beam width of 7.5°.

For the typical experimental conditions L $\approx$ 20km (i.e. at a heater beam width of 15°), $\Delta z \approx$ 10km, $E_0 \approx$ 25mV/m, the value of IL $\approx 3-5 \times 10^4$ A-m corresponds to a peak value of $\Delta\sigma \approx 3-4 \times 10^3$ sec⁻¹. This is achieved with an incident HF power density of 2 mW/m² at 75-80 km height. Finally it should be noted that the value of IL is independent of frequency and the frequency dependence in the ELF power is attributed to the scaling of the excitation efficiency as suggested by Galejs in 1971.

Figure 3:
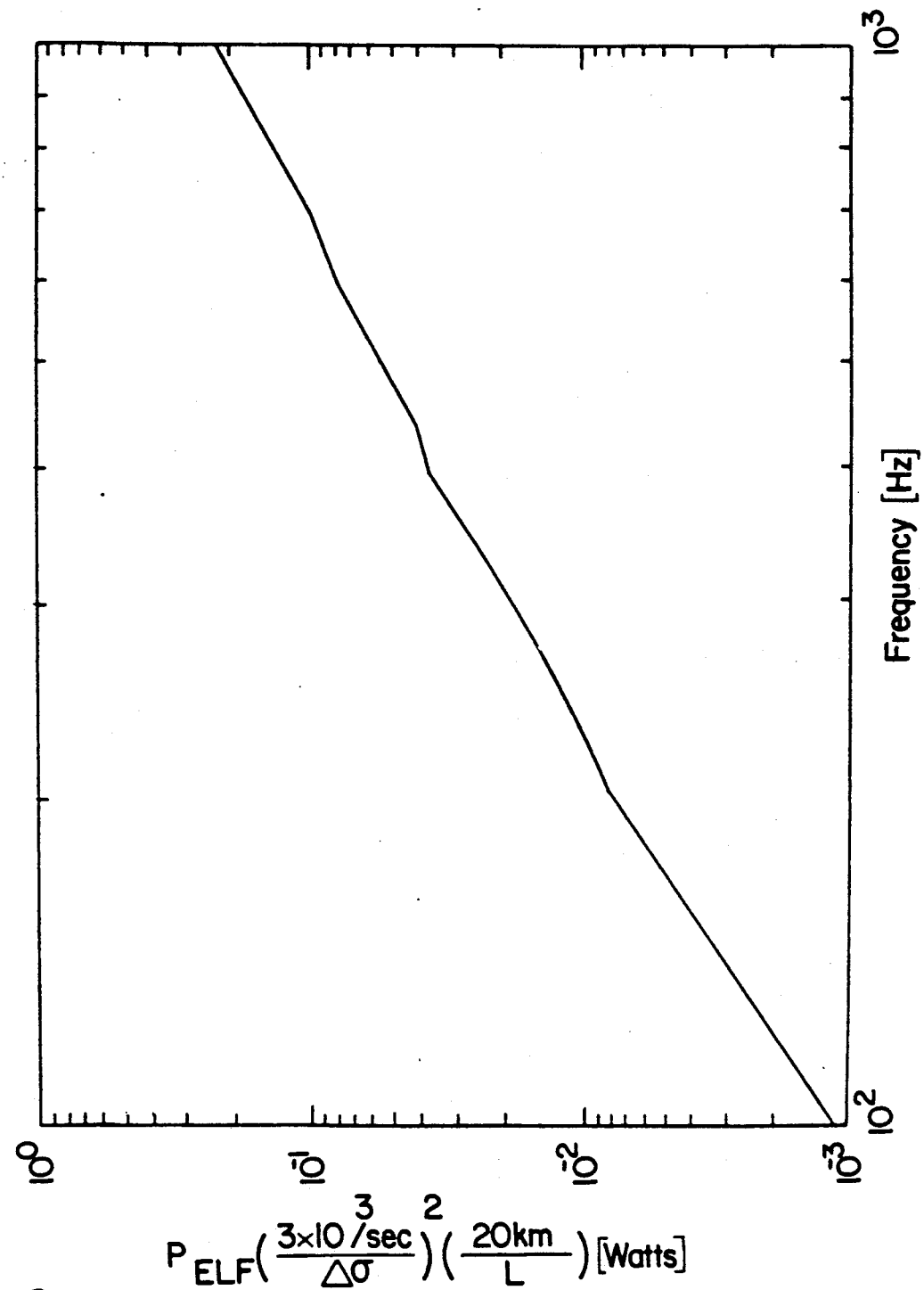
FIG. 3 shows ELF power v. frequency for the Tromso facility as determined by Barr & Stubbe, with the ELF power scale multiplied to emphasize the scaling with size L and conductivity $\Delta\sigma$.

Since the quantities that can be controlled from the ground are the value and the altitude location of the conductivity modulation, $\Delta\sigma$, and the size L, it is instructive to cast the experimental data as interpreted by Barr and Stubbe (1984a) in the form of FIG. 3. Notice the important scaling valid for each ELF frequency, i.e.

$$P_{ELF}M^2 \sim (\Delta\sigma)^2 L^4 \quad (6)$$

For instance, increasing the peak conductivity modulation by a factor of 10 while keeping L $\approx$ 20km, increases the radiated power at 500 Hz from 100 mW to about 10W. Similarly, increasing the size L by a factor of 5 while keeping $\Delta\sigma \approx 3-4 \times 10^3$ sec⁻¹, the radiated power would increase by a factor of $(5)^4 \sim 6 \times 10^2$.

A critical input needed for determining the factors that optimize $P_{ELF}$ is the scaling of the conductivity modification $\Delta\sigma$ on the HF power density S at the modified height, $$S = \frac{P_{HF}}{L^2} \quad (7)$$

where $P_{HF}$ is the ground HF power and L is the spot size at the appropriate height. Of course this neglects absorption at lower heights, a point discussed further herein. Assuming that $$\Delta\sigma \sim \left[\frac{P_{HF}}{L^2}\right]^\alpha \quad (8)$$

we find from (4) – (6) that $$P_{ELF} \sim P_{HF}^{2\alpha} L^{4(1-\alpha)} \quad (9)$$

For $\alpha \approx 1$, we find that $P_{ELF}$ is independent of the antenna gain and scales as $$P_{ELF} \sim P^2_{HF} \quad (10)$$

Namely the HF to ELF conversion increases as the square of the HF power. For $\alpha >> 1$ the ELF conversion efficiency increases enormously by increasing the ground based HF power, $P_{HF}$, while maintaining the same antenna gain (i.e., L = const.). For $\alpha >> 1$, more efficient conversion requires large spot sizes.

We now evaluate the level of conductivity modulation at various ionospheric heights as a function of the incident HF power density S. The calculation is "local" and neglects transport. From the modulated conductivity, we can evaluate the modulated current for a given ionospheric electric field. Contrary to previous studies (Stubbe and Kopka 1977, Tomko 1981, Chang et al 1981, James 1985) which used fluid equations to compute the variation of the electron temperature $T_e$ as a linear approximation, the present approach uses the complete time dependent kinetic equation for the electron energy distribution function $f(\epsilon)$. For an HF electric field of peak amplitude $E_o$ and frequency $\omega_o$ at the chosen height, $f(\epsilon)$ is given by (Gurevich 1978):

$$\frac{\partial}{\partial \epsilon} f(\epsilon) = \frac{1}{\sqrt{\epsilon}} \frac{\partial}{\partial \epsilon} \left( \epsilon^{3/2} D \frac{\partial f}{\partial \epsilon} \right) - L(\epsilon) \quad (11)$$

$$D(\epsilon) = \frac{1}{6} \frac{e^2 E_0^2}{m} \frac{\nu(\epsilon)}{(\omega_0 \pm \Omega)^2 + \nu^2(\epsilon)} \quad (12)$$

where $\nu(\epsilon)$ is the energy dependent electron-neutral collision frequency at the chosen height and $\Omega$ is the electron cyclotron frequency. $\nu(\xi)$ can be written as:

$$\nu(\epsilon) = \sum_m N_m \sigma_m(\epsilon) \nu \quad (13)$$

where $N_m$ is the neutral density at the chosen height, $\tau_m$ is the momentum transfer cross section and the summation is carried over both $O_2$ and $N_2$ species. The ± signs correspond to o (+) and x (−) mode heating correspondingly. The term $L(\epsilon)$ operator that represents the energy loss due to various inelastic processes. It includes excitation of rotational, vibrational and optical levels as well as ionization and attachment for $N_2$ and $O_2$. Detailed expressions of the inelastic contribution were given by Gurevich in 1978. Note that the latter process is not important for the power densities analyzed here. Equation (11) can be solved numerically for $f(\epsilon, t)$ at various altitudes, HF power density values, S, and modulation frequencies, $\omega$. The time dependence of the conductivity is found from $$\sigma p^{(l)} = \frac{ne^2}{m} \int \frac{\nu(\epsilon)}{\Omega^2 + \nu^2(\epsilon)} f(\epsilon, t) \epsilon^{\frac{1}{2}} d\epsilon \quad (14a)$$

-continued $$\sigma h^{(l)} = \frac{ne^2}{m} \int \frac{\nu(\epsilon)}{\Omega^2 + \nu^2(\epsilon)} f(\epsilon, t) \epsilon^{\frac{1}{2}} d\epsilon \quad (14b)$$

$$\sigma z^{(l)} = \frac{ne^2}{m} \int \frac{1}{\nu(\epsilon)} f(\epsilon, t) \epsilon^{\frac{1}{2}} d\epsilon \quad (14c)$$

where $\sigma p$, $\sigma h$, $\sigma z$ are the Pederson, Hall and parallel conductivities and n is the electron density. As noted previously herein, a kinetic analysis is an absolute requirement for exploring high power densities. The initial $f(\epsilon, t=0)$ was taken as Maxwellian at $T_e \approx 0.025$ eV. For the studies reported herein $\omega_o \approx 1.8 \times 10^7$ rad/sec which corresponds to a heater frequency of 2.8 MHz.

Figure 4:
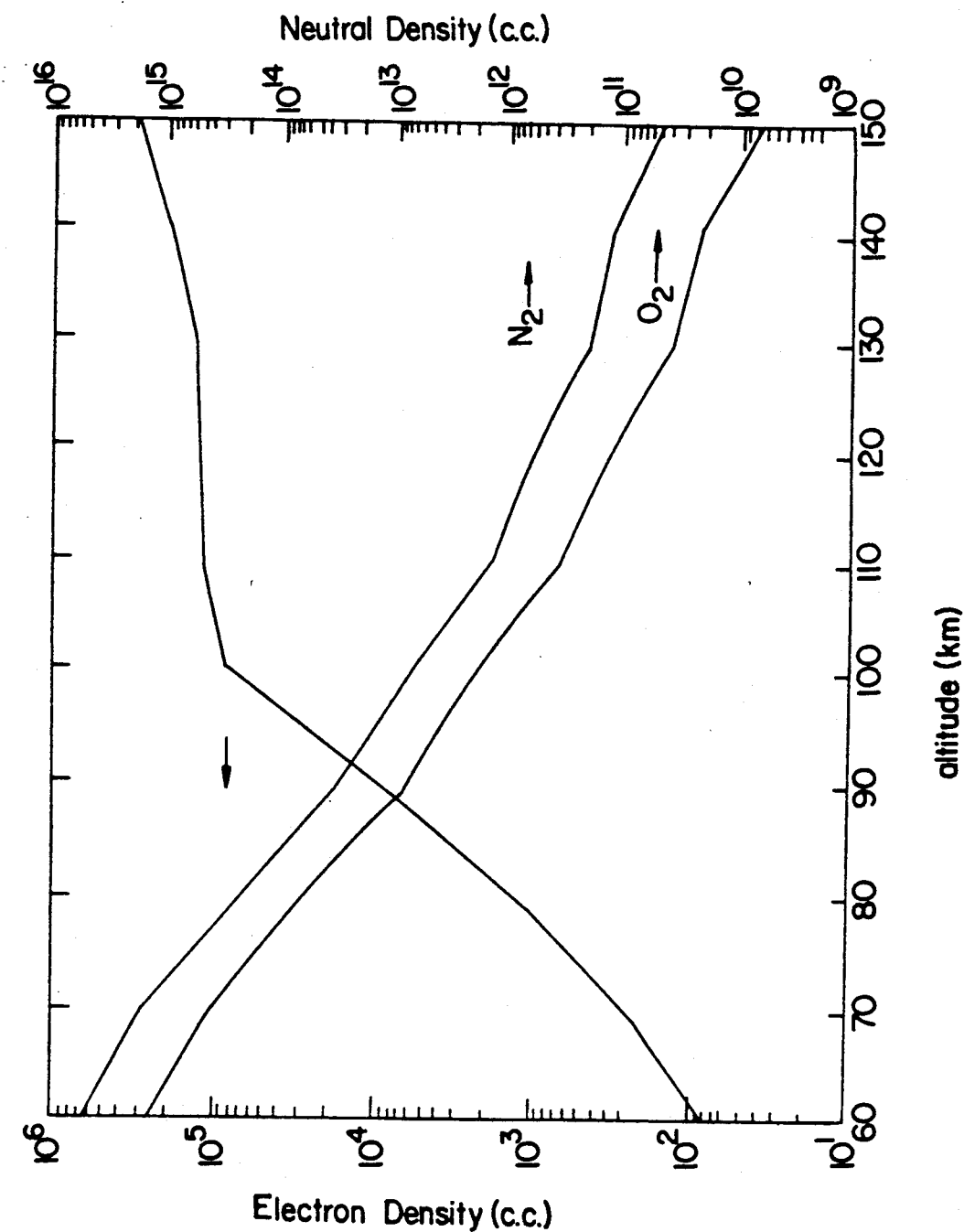
FIG. 4 illustrates the ionospheric model used in determining the energy dependent electronneutral collision frequency at a chosen height.

We report below results for daytime ionospheric conditions corresponding to altitudes between 70-100 km. The ionospheric model used is shown in FIG. 4.

Figure 5A:
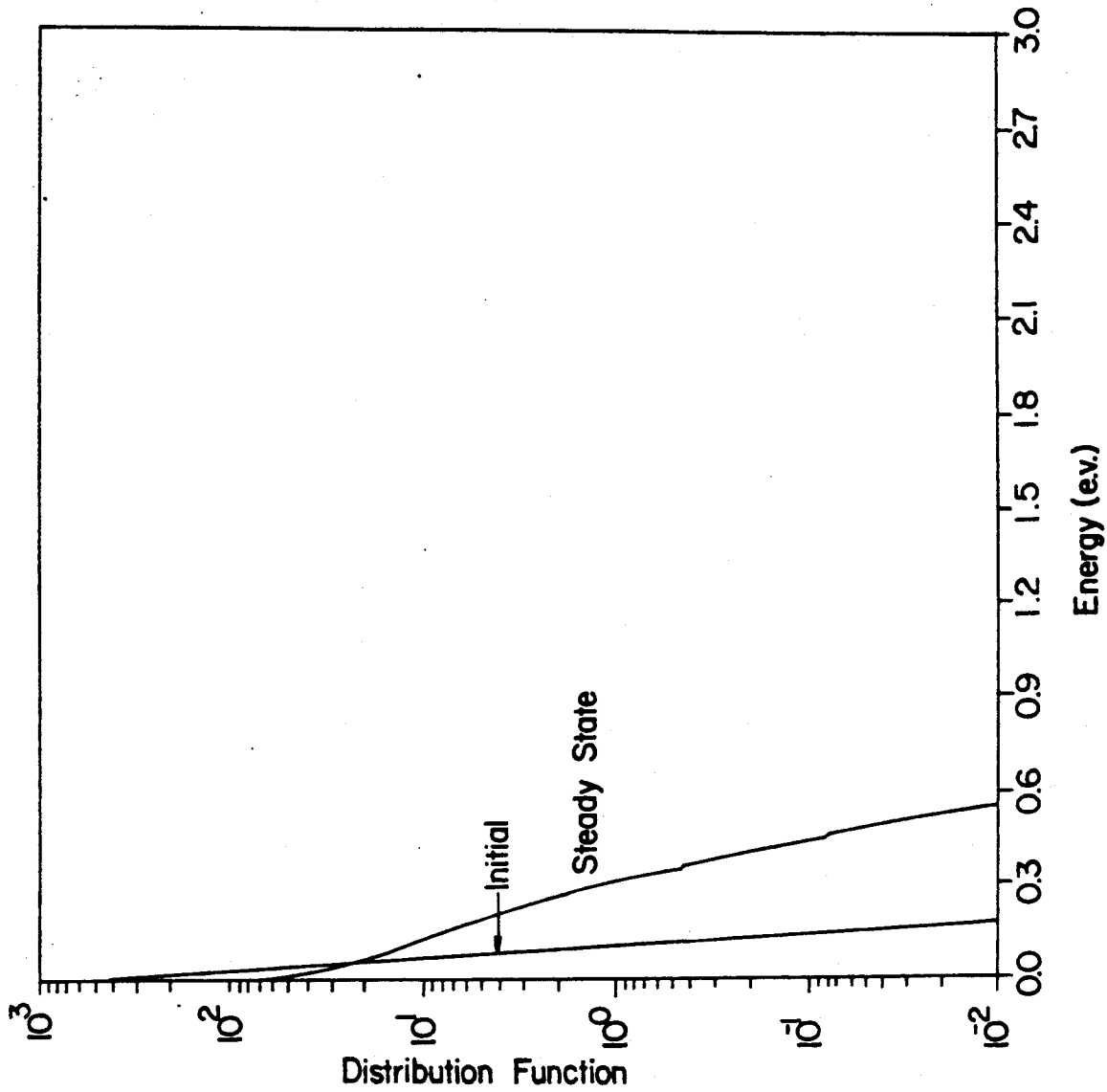
FIG. 5a shows the initial and steady state electron distribution for 75 km & $S=10^{-3}$ W/m$^2$.
Figure 5B:
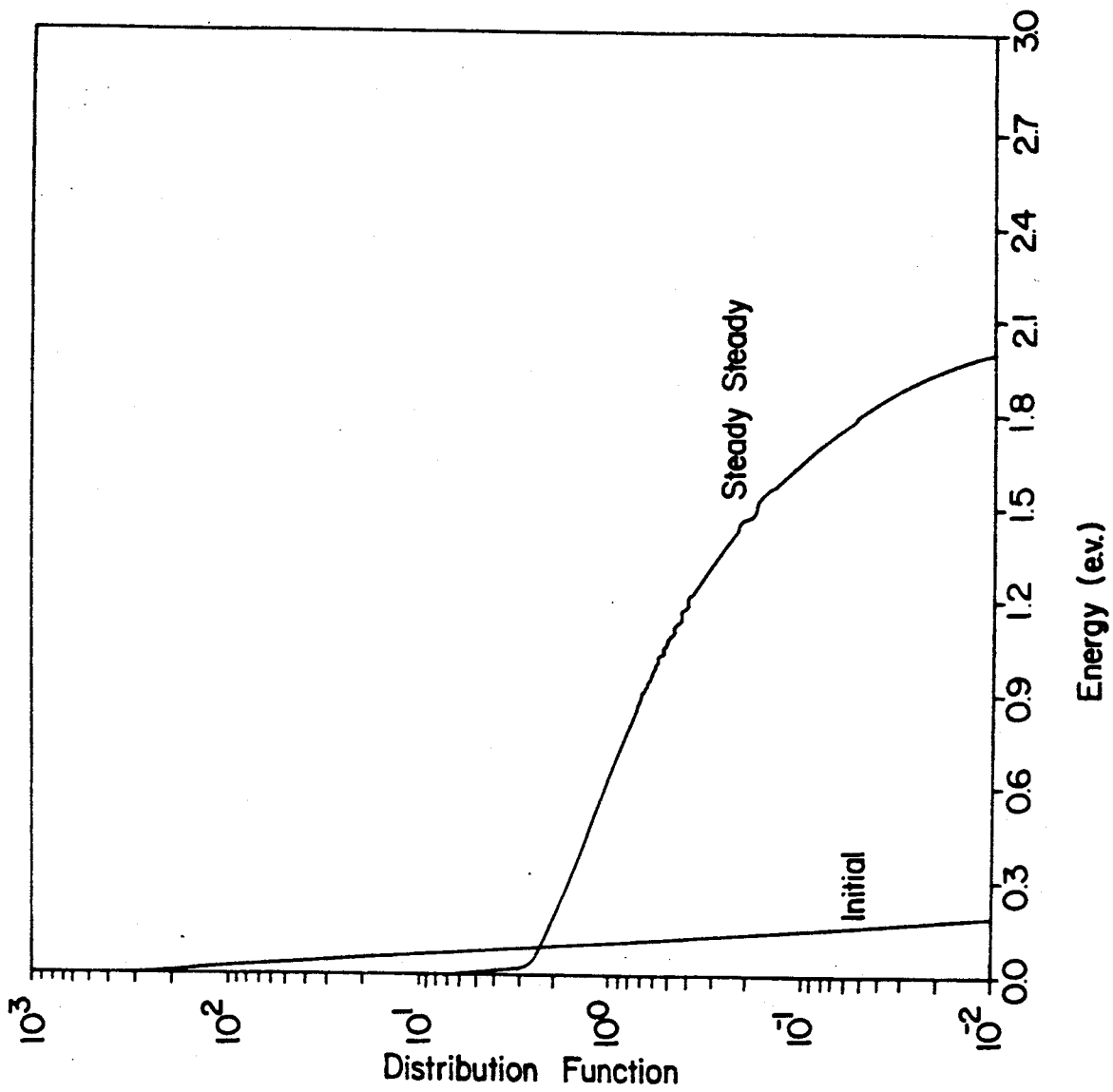
FIG. 5b and 5c show the initial and steady state electron distribution for $S=10^{-2}$ W/m$^2$ at 90 km & 100 km respectively.
Figure 5C:
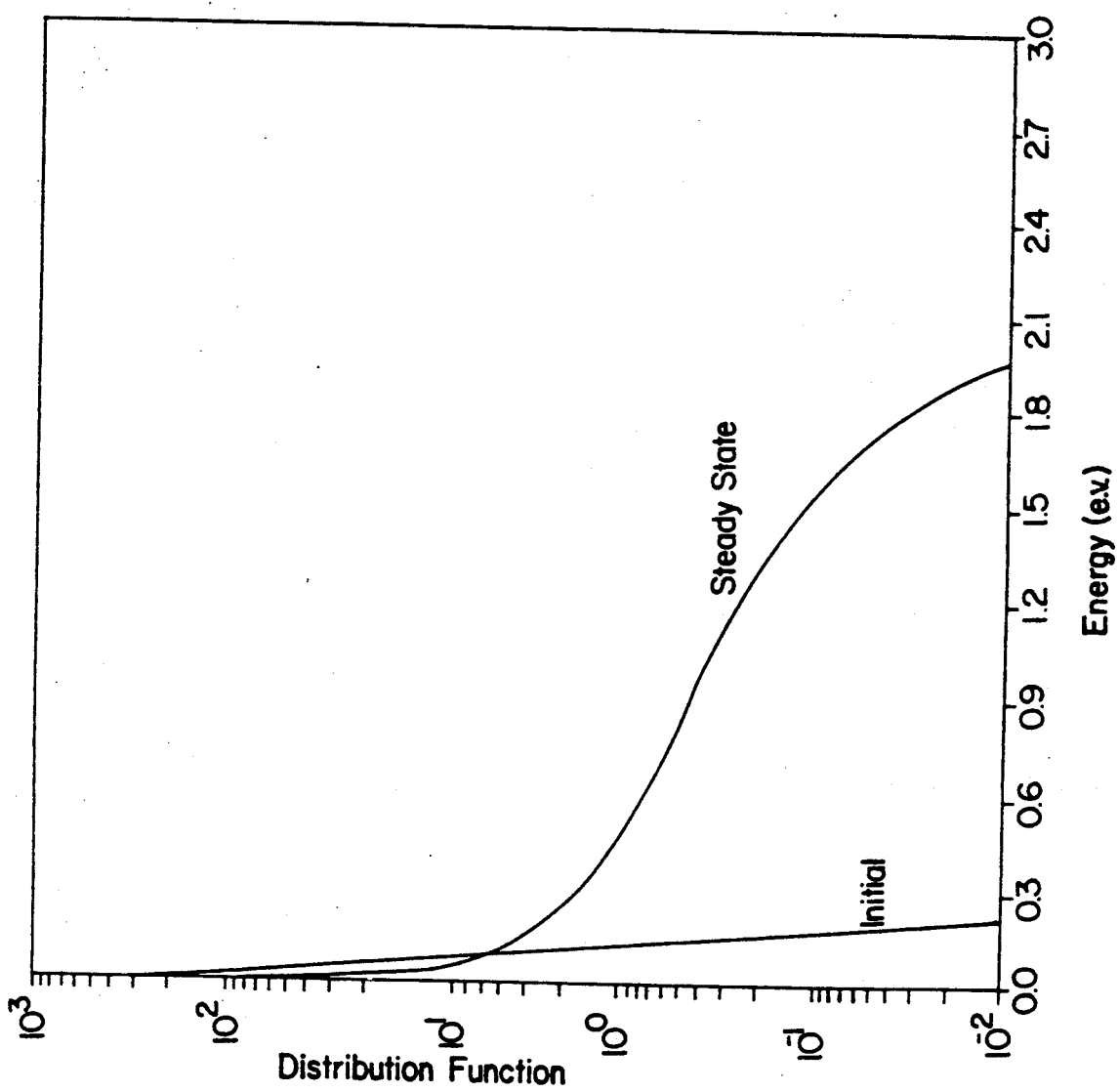

The need for a kinetic description at high power and high altitude is obvious from the distribution function shown in FIG. 5. FIGS. 5a-c show the initial and steady state distribution functions for ionospheric heating at 75 km, 90 km and 100 km altitude and at values of S=$10^{-3}$ W/m², $10^{-2}$ W/m², $10^{-2}$ W/m² correspondingly. The time required to reach steady state was in all cases much shorter than $10^{-4}$ sec. This implies that steady state is reached at times much shorter than the relevant modulation frequencies. It is seen that at low altitude and low power density (i.e. 75 km, $10^{-3}$ W/m²) $f(\xi)$ does not deviate much from Maxwellian and the fluid description is a reasonable approximation. This, however, is not true for the other two cases where the high energy tails of the distribution functions become the dominant part.

FIGS. 6-7 show the time dependence of the Hall and Pedersen modulation respectively for the above three cases. At 75 km and $10^{-3}$ W/m² the Hall conductivity modulation is about 7 × $10^3 \text{sec}^{-1}$ which is consistent with the value from the Tromso experiments. The Pederson conductivity modulation is significantly smaller. This is reversed for the 90km and 100km cases at $10^{-2}$ W/m². The Hall conductivity modulation becomes progressively smaller and is negligible at 100 km. Furthermore, the level of the Pederson conductivity modulation is about 3 × $10^4$ sec$^{-1}$ at 90 km and 6 × $10^4$ sec$^{-1}$ at 100 km. It is clear that if the size L, which is controlled by the antenna gain was the same for all three cases and the increase in the power density was entirely due to an increase in $P_{HF}$ by a factor of 10, the radiated $P_{ELF}$ would increase by factors of 20 and 100 for the 90km and 100 km cases respectively over the 75 km case. Since steady state is established for all cases much earlier than the low frequency oscillation period, the values of $\Delta\sigma$ are independent of the ELF frequency.

Figure 8:
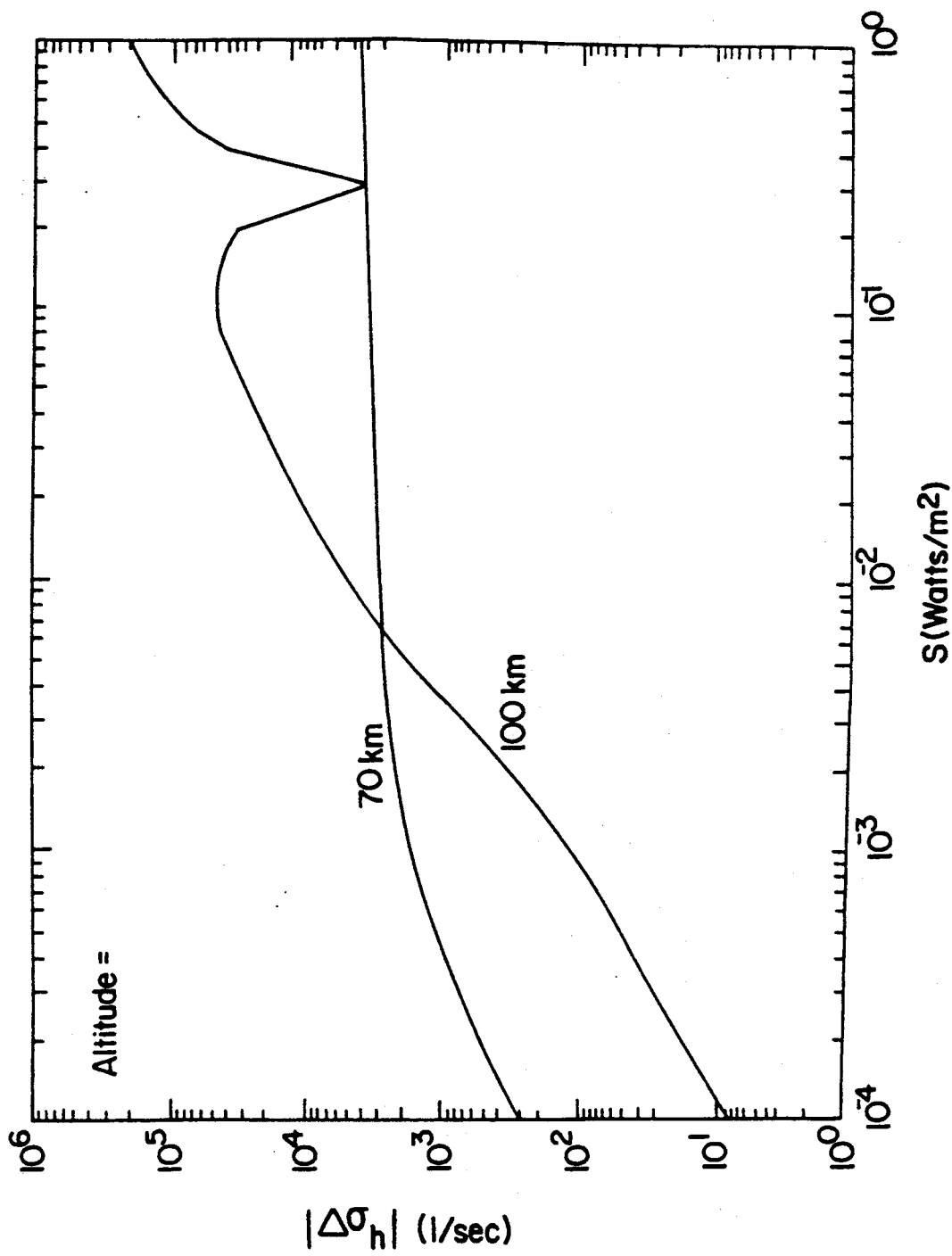
FIG. 8 shows Hall conductivity modulation vs. S at 70 km and 100 km.
Figure 9:
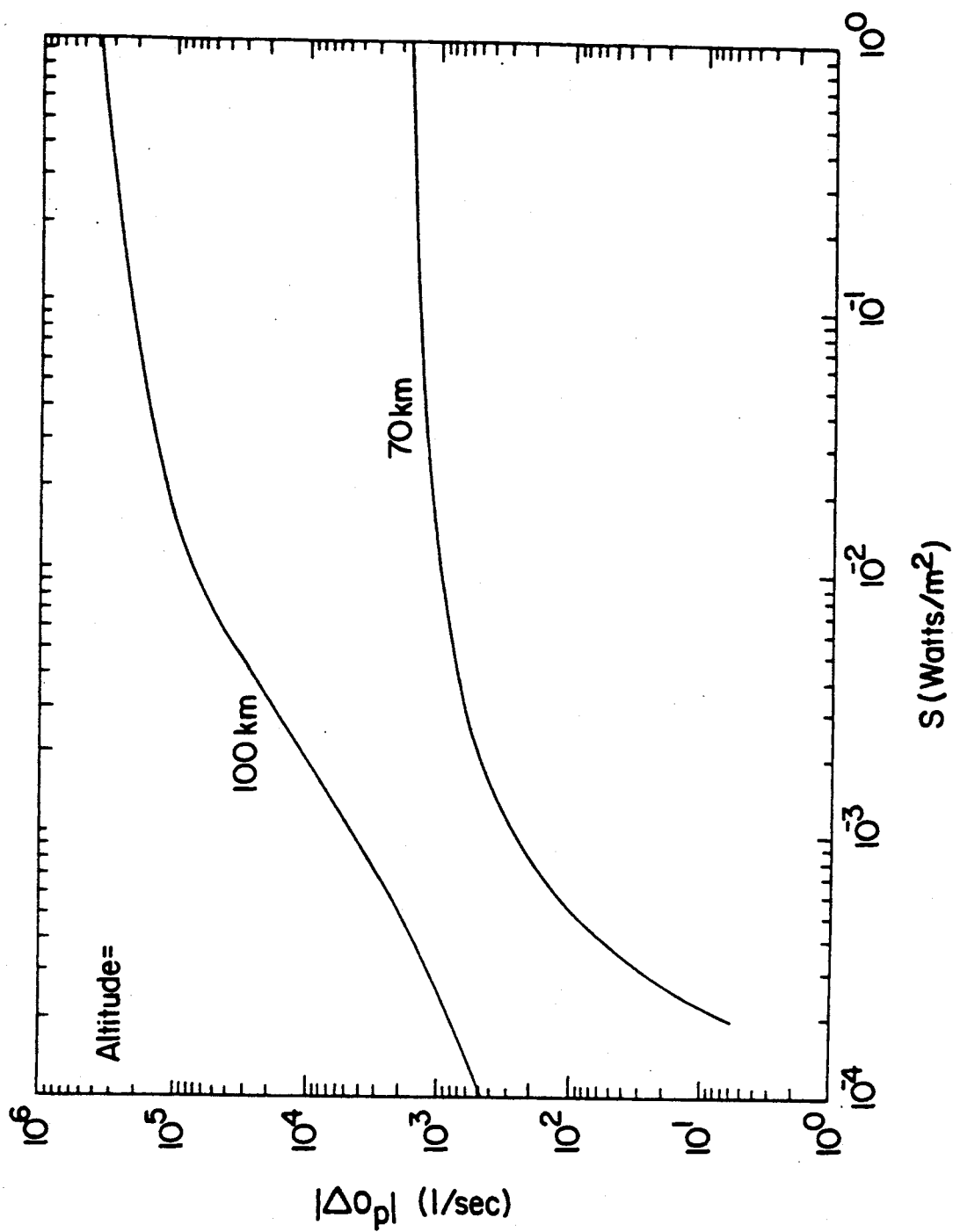
FIG. 9 shows Pedersen conductivity modulation vs. S for 70 km and 100 km.

In order to determine the scaling of the conductivity modification with power density and altitude, a survey was performed of the level of steady conductivity modification for altitudes 70 and 100 km and values of S in the range of $10^{-4}$ − 1 W/m². The results for the Hall and Pederson conductivities are shown in FIGS. 8 and 9. The boundary altitudes were chosen in a way that they reflect the range of variation of the Pedersen and Hall conductivities with altitude.

For low altitudes (70-75 km) the Hall conductivity provides the dominant contribution. The value of $\Delta\sigma_h$ increases very weakly with power density ($\alpha < \frac{1}{2}$) and saturates at a value of S about $10^{-3}$W/m². Further increasing the power density does not produce any increase in the modulated current density. In accordance with the discussion of Eq.(10) above, optimization of the conversion efficiency requires increases in L under constant S.

For high altitude (> 90 km) heating, modification of the Pederson conductivity dominates. The value $\Delta\sigma_p$ increases as $S^2$ (i.e. $\alpha=2$), up to power density of $10^{-2}$ W/m$^2$ and saturates slowly afterward. There is an obvious premium in increasing $P_{HF}$, since in this case $P_{ELF}$ $P^4_{HF}$, while keeping $S=10^{-2}$ W/m$^2$.

Finally, the maximum value of $\Delta\sigma$ is achieved for high altitude heating.

In order to have uniformity in the results and be close to the benchmark case, the survey shown in FIG. 5 was performed using the same frequency $\omega_o = 1.8 \times 10^7$ for all the three altitudes examined (75, 90, 100km). This frequency corresponds to a critical electron density $n_c = 10^5$ #/cm$^3$ which corresponds to an altitude of 105 km for the model ionosphere used here. The electron densities at 75, 90 and 100 km (FIG. 4) are $3 \times 10^2$ #/cm$^3$, $8 \times 10^3$ #/cm$^3$ and $8 \times 10^4$ #/cm$^3$. Since collective effects are not included, the 100 km results are close but within the validity range of the model. Furthermore, as long as the half width of the heater is smaller than 26°, effects of resonance absorption can also be neglected even for the 100 km case. However, we should note that for the high altitude cases (> 90 km) the results are applicable to frequencies higher than the 2.8 MHz by a simple scaling law based on Eqs. (9) and (10). Note that for $\omega > 2.8$ MHz and h > 90 km, $(\omega_o \pm \Omega)^2 >> V(\xi)$. Therefore $$D(\bar{\epsilon}) = \frac{1}{3} \bar{\epsilon}v(\bar{\epsilon}) \tag{15}$$

Where $D(\epsilon)$ is the quiver energy of the electrons in the high frequency field, with an effective frequency $\omega_{eff} = \omega_o \pm \Omega$, defined as $$\bar{\epsilon} = \frac{1}{2} m \left( \frac{eE_o}{m\omega_{eff}} \right)^2 \tag{16}$$

The results can be generalized to any frequency by noting that the solution of Eq. (11) is self-similar with respect to the value of $$\frac{\bar{\epsilon}^2}{\omega_{eff}}.$$

Thus, for a frequency $\omega > \omega_o$ a power density is higher by a factor $(\omega \pm \Omega)^2 / (\omega_o \pm \Omega)^2$ than for $\omega = \omega_o$ will be required.

Figure 2:
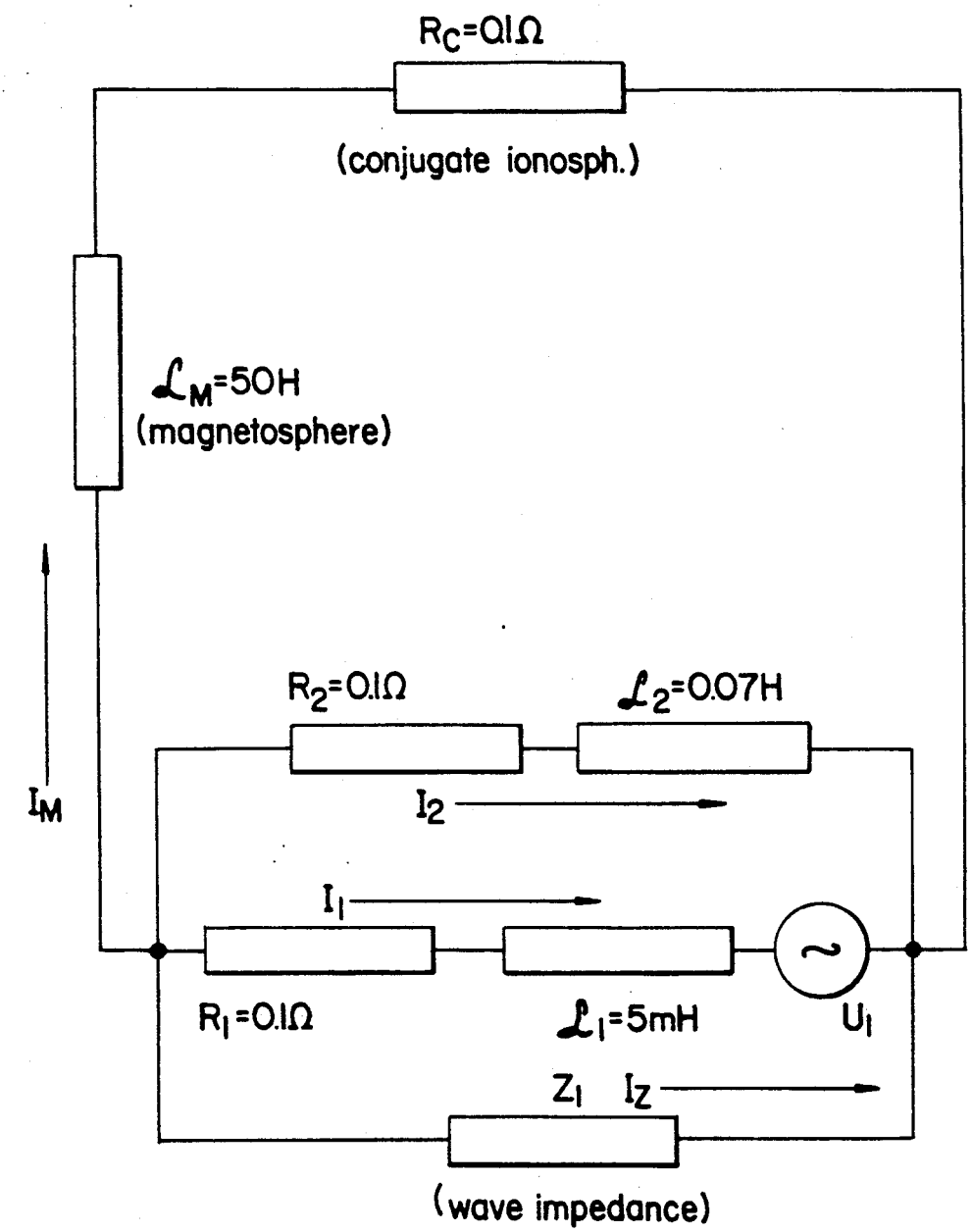
FIG. 2 shows the equivalent circuit system to describe modulation current.

We now combine the results of Barr and Stubbe (1984) as shown in FIG. 2 with the results reported above and use them to determine the HF to ELF conversion efficiency and techniques by which it can be optimized. Based on Hall conductivity modulation of the polar electroject at 70-75 km altitude Barr and Stubbe (1984) estimate a power conversion efficiency of 5-10 mW per MW of HF at 200 Hz. This implies an overall conversion efficiency of about $10^{-8}$, compared with $10^{-6}$ conversion achieved by the Navy facility. For low altitude heating the results discussed above indicate that increasing the power does not have any significant effect an the ELF power. However, as shown in Eq. (4) for constant power density and therefore constant $\Delta\sigma$, $P_{LEF} - L^4$.

This suggests that increasing the heating area increases the efficiency. Equation 5 can be rewritten as:

$$\eta = \frac{K\Delta\sigma^2 L^4}{P_{HF}} \tag{17}$$

wherein K incorporates factors beyond control, i.e., $E_0$, $\Delta Z$, $\epsilon$, etc.

Increasing the size of the modulated region requires matching the operation characteristics of the HF heater to the non-linear response of the ionosphere. In order to be specific, we consider the particular case of 200 Hz ($\Omega = 1.2 \times 10^3$ sec$^{-1}$).

The particular observations were made using an HF frequency $f = 2.76$ MHz, effective radiated power ERP = 150 MW, and antenna beam width $2\Theta_0 = 15°$; the estimated ELF power was 6-8 mW, giving an efficiency of $\eta \sim 10^{31\ 8}$. The observations were consistent with a modified Hall current density of $10^{-8}$ A/m$^2$, which corresponds to a conductivity modification of $\Delta\sigma_0 = 4 \times 10^{-7}$ mhos at an altitude $h_0 = 78-80$ km, and a value of $E_0 = 25$ mV/m. The value of $T_e$ corresponding to the modified conductivity was saturated at $T_e \approx 2000K$. The power density at 78-80 km was of the order of 2 mW/m$^2$. For the ELF/ULF frequency range of interest, the observed ELF power was consistent with a horizontal dipole in the ionosphere with magnetic moment $M = 3.5 \times 10^4$ A-m. As is well known from the work of Galejs, horizontal dipoles are inefficient exciters of the earth ionosphere waveguide at 100-200 Hz, having excitation efficiency $\epsilon$ of the order of $10^{-2}$ compared with that of a comparable ground based electric dipole. Notice that ground based ELF sources are also very inefficient, with typical efficiencies $\epsilon$ of the order of $10^{-3}$ or less for horizontal magnetic dipoles. From Eq. (17), the measured efficiency and the values discussed above, we can rewrite Eq. (17) as $$\eta = 10^{-8} \left( \frac{\Delta\sigma}{\Delta\sigma_0} \right)^2 \left( \frac{P_{HF,0}}{P_{HF}} \right) \left( \frac{L}{L_0} \right)^4, \tag{18}$$

where $\Delta\sigma = 4 \times 10^{-7}$ mhos, $L_0 = h_0 \tan\Theta_0 \approx 10$ km, $P_{HF,O} = 1$ MW are the values of the reference case. The on-off heater time $rH_O$ is half of the wave period of 200 Hz. Furthermore, we should remember that the $\Delta\sigma_O$ modification over an $L^2_O$ area was accomplished with an incident power flux $S_O \approx 2$ mW/m$^2$ at $h_O$.

The modulated heating of the ionosphere by an X-mode HF field of frequency $\omega$ and peak amplitude $E_O$ is given by $$\frac{3}{2} \frac{dT_2}{dt} = 2\bar{\epsilon}\bar{v}_{en} \frac{1}{1 + v^2_{en}/\omega_0^2} - \tag{19}$$

$$v_{er}(T_e - T_0) - v_{ev} \exp\left[f \frac{T_e - 2000}{2000 T_e}\right],$$

where $\epsilon$ is the quiver energy defined as $$\bar{\epsilon} = \frac{1}{2} m \frac{e^2 E_0^2}{m^2 \omega_0^2} \tag{20}$$

and $\omega_O$ is the effective frequency $$\omega_O = \omega - \Omega_e \tag{21}$$

Also $\Omega_e$ is the electron cyclotron frequency $\nu_{en}$ is the electron neutral collision frequency for momentum transfer $\nu_{er}$ the rate of inelastic electron neutral collisions resulting in excitation of the rotational levels of $N_2$, the term with $\nu_{ev}$ is the vibrational loss and $T_O \approx 100$ K is the ambient temperature of the neutrals. For the range of electron energies of interest here $$\nu_{en} = 2.3 \times 10^{-9} N \left( \frac{T_e}{100\,K} \right) \equiv \nu_0 \left( \frac{T_e}{100\,K} \right) \tag{22a}$$

$$\nu_{er} = 3.2 \times 10^{-11} N \left( \frac{T_e}{100\,K} \right)^{-\frac{1}{2}} \equiv \nu_R \left( \frac{T_e}{100\,K} \right)^{-\frac{1}{2}} \tag{22b}$$

$$\nu_{ev} = 3.5 \times 10^{-8} N \equiv 1068 \nu_R,$$

where N is the number density of the neutrals. Defining $$y \equiv T_e/T_0, \tau \equiv \nu_R t \tag{23}$$

$$K \equiv 2 \left( \frac{\bar{\epsilon}}{T_0} \right) \frac{\nu_0}{\nu_R}, \quad a^2 \equiv \nu_0^2/\omega_0^2,$$

we can cast Eq. (19) in a dimensionless form as $$\frac{3}{2} \frac{dy}{d\tau} = K \frac{y}{1 + a^2 y^2} - \frac{y-1}{\sqrt{y}} 10.68 \exp\left[ f \frac{y-20}{y} \right], \tag{24}$$

where $F = 5.3 \pm 3.755 \tanh [0.11(y-18)]$. The modification of the temperature results in changes in the conductivity of the medium. For the ionosphere, the conductivity tensor $\sigma$ transverse to the magnetic field is given by $$\sigma = \begin{bmatrix} \sigma_P & \sigma_H \\ -\sigma_H & \sigma_P \end{bmatrix}, \tag{25}$$

where $\sigma_P$ is the Pedersen conductivity, i.e., the conductivity along the electric field $E_O$ and $\sigma_H$ is the Hall conductivity. In our dimensionless units they are given by $$\sigma_P = \Gamma \frac{1}{1 + \beta^2 y^2}, \tag{26a}$$

$$\sigma_H = \Gamma \frac{1}{1 + \beta^2 y^2}, \tag{26b}$$

where $$\beta = \nu_0/\Omega_e = 2.7 \times 10^{-2} \left( \frac{N}{10^{14}} \right) \tag{27}$$

$$\Gamma = \frac{\omega_e}{4\pi \nu_R} \frac{\omega_e}{\Omega_e} \tag{28}$$

where $\omega_e$ is the plasma frequency and we have taken $\Omega_e/2\pi 1.35$ MHz. From the above equations we note that the values of the dimensionless quantities $\alpha$ and $\beta$, $\Gamma$ and $\tau$ are altitude dependent, while the value of K depends only on the incident HF power density. Equations (13)–(28) can and have been solved numerically under several conditions. Important insight is provided by considering some limiting cases.

(i) The regime of interest corresponds to $\beta << 1$, i.e., neutral densities $N \approx 10^{14}$ #/cm³, so that for $y=1$, $r_P/r_H << 1$. Furthermore, heating always decreases $\sigma_H$ forcing the Hall current to flow outside the heated volume. The Pedersen conductivity has a different dependence on Y. For values of $\beta y < 1$, $\sigma_P$ increases with y, producing currents in antiphase with the Hall currents, while for $\beta Y > 1$ it decreases with y and the currents are in phase with the Hall currents. Notice that since the ambient electrojet current flows at an angle $$\delta = \tan^{-1}(1/\beta)$$

with respect to the ambient $E_O$, it is a Hall current. For $\beta y = 1$ it flows at a 45° angle with respect to $E_O$. This implies that the induced polarization electric field $E_P$ has the same value as $E_O$. Finally for $\beta y >> 1$ the Pedersen current becomes dominant.

(ii) Inspection of the heating equations, Eqs. (24), shows the presence of a strong barrier for values of y $\approx$ 20–30 due to the third term on the right side of Eqs. (24). This term is due to the high value of the inelastic electron-$N_2$ cross section for vibrational excitation. It implies a heavy energy penalty in achieving temperatures past y $\approx$ 20.

(iii) Equations (24) shows that for values of $<20\alpha y<1$ the heating rate is exponential with $\tau$, while the cooling rate, which in this regime is due to rotational energy transfer, has a weaker ($\tau^2$) dependence.

Following Barr and Stube we assume that the source height is at 78–80 km, which corresponds to neutral density $N \approx 2 \times 10^{14}$ #/cm³. For this value of density $\alpha = 0.05$ and $\alpha = 0.05$. The value of the quiver energy in K is given by $$\bar{\epsilon} = 22 \left( \frac{S}{m\omega/m^2} \right) \left( \frac{MHz}{f_0} \right)^2 K \tag{29}$$

Figure 10:
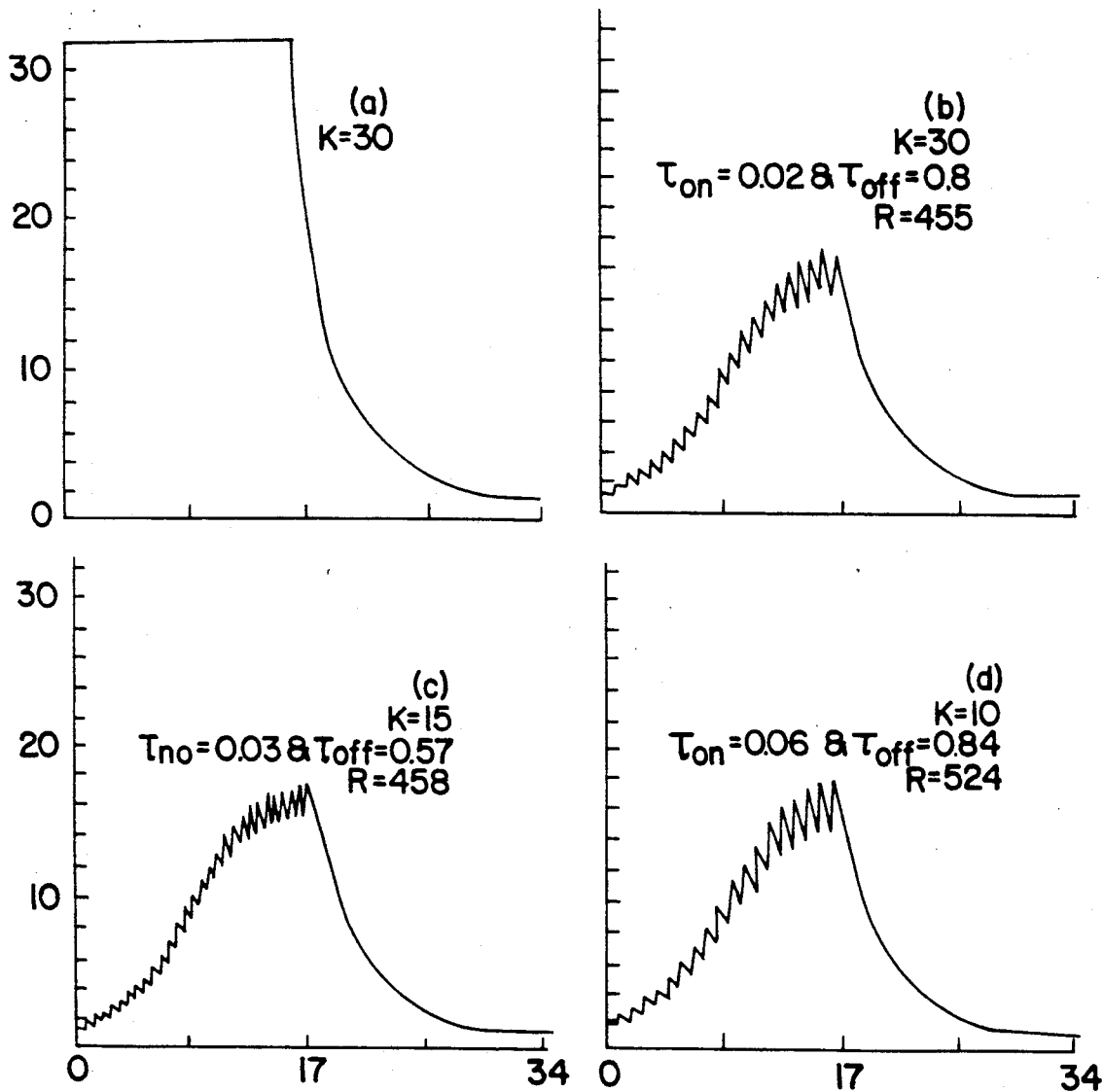

For f 2.76 MHz, ERP of 150 MW which corresponds to 2 mW/m and $T_O \approx 100$ K, $\sim \bar{\epsilon}/T_O \approx 22$. Using Eq. (23), we find that K = 30. Finally for an ELF frequency of 200 Hz the dimensionless ELF time is $\tau_{ELF} = 34$. FIG. 10(a) shows the waveform of y for a square wave heater operation with period half the period of the ELF wave. It clearly demonstrates the inefficient fashion in which the heater power is utilized. First, more than 95% of the power is utilized to maintain the temperature at its saturated value, while the absorbed energy is transferred to the excitation of $N_2$ vibrations which, of course, do not contribute to the conductivity modification. Second, we are overheating the plasma. There is little, if any, gain by heating past the value of $y = 1/\beta$, as is obvious from Eqs. 24a & b. FIG. 10(a), however, also suggests the operating procedure which can lead to improved efficiency, which is discussed next.

Figure 11:
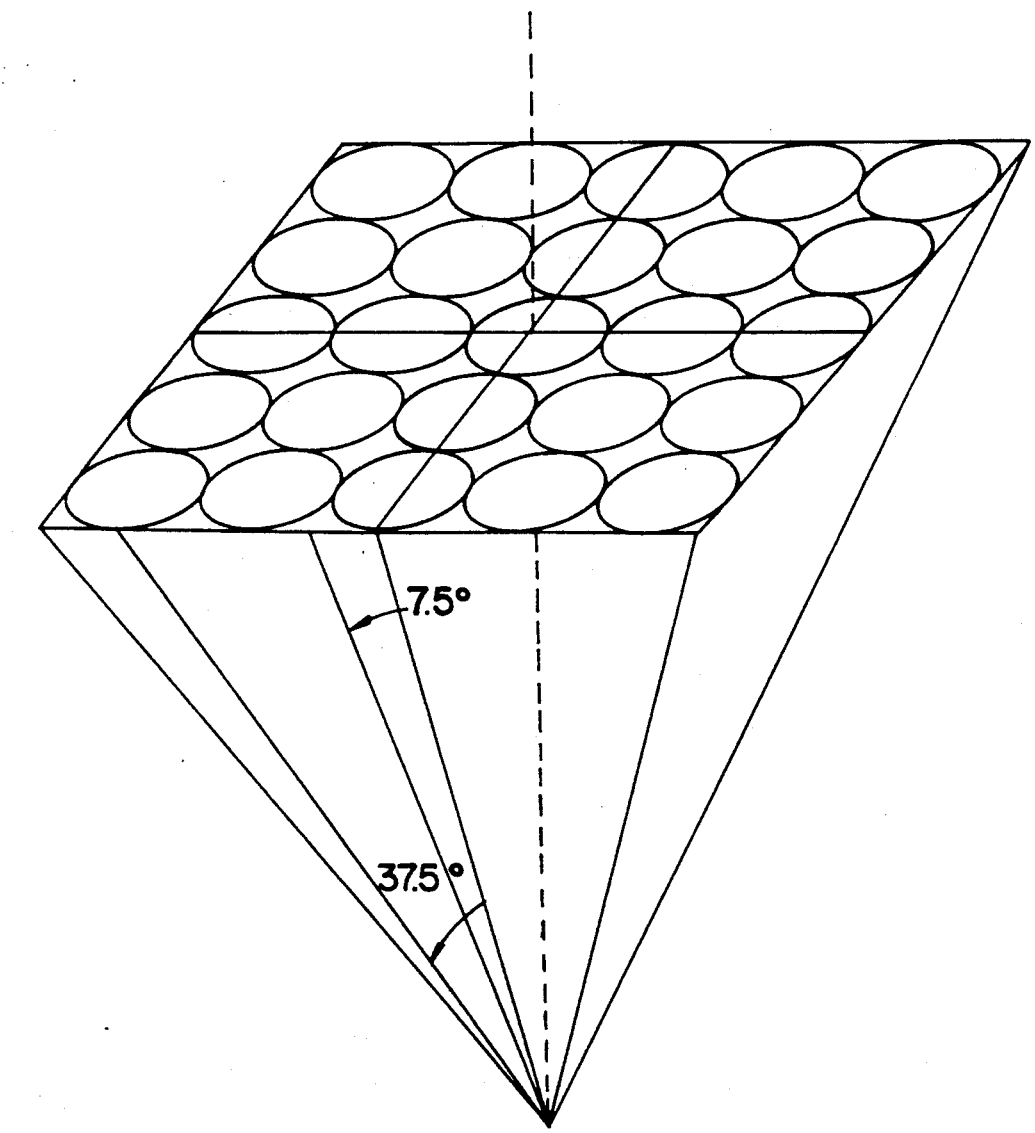
FIG. 11 shows enhancement of ELF power by sweeping over an area with a beaming angle of 37.5°.

Let us consider a facility with the same average power as the Tromso "Heater" facility but equipped with the capability to scan fast over an area up to a cone of 37.5° (FIG. 11). The ratio of this area to that modified by the 7.5° half-beamwidth HF antenna is $$\xi = \left( \frac{\tan 45°}{\tan 7.5°} \right) \approx 60.$$

If using the same average power as the "Heater" facility we modify the conductivity of the accessible area A at the desired ELF frequency, the efficiency, according to Eq. (18), will increase by a factor $\xi^2$ which corresponds to $3.3 \times 10^3$. It will, however, be reduced by the relative modification of conductivity. The quadratic dependence $\xi^2$ on the area is a consequence of the fact that a larger area produces a simultaneous increase in total current as well as flux. Techniques by which this can be accomplished are demonstrated below.

We now compute the power enhancement over the standard case that can be accomplished by dividing the area A corresponding to the cone of 37.5° into a number of smaller areas $A_O$ corresponding to the half-beamwidth of 7.5°, and sweeping the transmitter so that during the half cycle $\tau_{ELF}/2 = 17$ it stays on each spot only $A_O/A$ of the time. The expected enhancement of R of the ELF power over that of the standard case is given by the ratio of the efficiencies obtained from Eq. (17) for the two cases. The antenna with beamwidth of 15° irradiates each area $A_O$ for the duration $\tau_{on}$ with a revisit time $\tau_{off}$ and so the total heated area is $A = (\tau_{on} + \tau_{off})A_O$. Further, if the antenna gain K is reduced from the value of 30, the heated area is increased by the factor 30/K. Thus, for the same power $P_{HF}$, we get $$\left( R = \frac{30}{K} \right)^2 \left( \frac{\tau_{on} + \tau_{off}}{\tau_{on}} \right)^2 \left( \frac{\Delta \overline{\sigma}}{\Delta \sigma} \right)^2 \quad (30)$$

where $\Delta \sigma$ is the final conductivity modification averaged overall the spots and $\Delta \sigma = 0.72$ is the conductivity modification of the standard case (FIG. 10(a)). The heated area can be increased by choosing small $\tau_{on}$ and large $\tau_{off}$, whose limits are set by the heating and cooling timescales. The heating timescale is given by Eq. (24), which for $y > 1$ yields $y = y(\tau = 0) \exp(\tau/\tau_O)$ with $\tau_O = 3/2K$. To achieve a 20% rise in the temperature in one heating cycle we need $\tau_{on} \approx 0.2 \tau_O$, which is 0.01 for $K = 30$. A value $\tau_{on}$ smaller than this will lead to a weak heating. Since the idea of the proposed scheme is to avoid the strong vibrational losses by keeping $T_e < 2000$ K, the relevant cooling time is that due to the rotational losses. In the normalized units this has a value $\sim 1$ and so $\tau_{off}$ should be $< 1$ to prevent excessive cooling. With these considerations different cases are examined as follows.

We first take the case where the full power (K=30) of the antenna irradiates each area $A_O$ over a time $\tau_{on} = 0.02$ with a revisit time $\tau_{off}$. The procedure was repeated until $\tau = 17$. The enhancements for different values of $\tau_{off}/\tau_{on}$, results in an increase of R. This is, however, accompanied by a decrease in $\Delta \sigma$ because the distribution of the power into a much larger area limits the heating. This overcomes the advantage of the increase in area, and beyond $\tau_{off}/\tau_{on} = 40$ the value of R decreases. There is thus a balance between these two effects, and it gives an optimum value of $\tau_{off}$ for a given $\tau_{on}$. The peak enhancement for this case was 455, corresponding to $\tau_{off}/\tau_{on} = 40$, and the heating profile of the temperature of a typical spot is shown in FIG. 10(b). The value of $\Delta \sigma$ is the average obtained in the last $(\tau_{on} + \tau_{off})$ before the power was turned off at $\tau = 17$.

With the same K value and different values of $\tau_{on}$, the enhancement R will be optimum at different values of $\tau_{off}/\tau_{on}$. The reason for the relatively low enhancement compared to the theoretical maximum of $3 \times 10^3$ is the reduction in the conductivity modulation, giving a low value for the $(\Delta \overline{\sigma}/\Delta \sigma)^2$ factor.

TABLE I

Enhancement of the ELF generation for different antenna gains (K) and $\tau_{off}/\tau_{on}$ ratios. a. The enhancement R for K = 30 and a wide range of values of $\tau_{off}/\tau_{on}$. The gain from increasing $\tau_{off}/\tau_{on}$ is offset by the accompanying decrease in $\Delta \sigma$, giving the peak value of R — 455. b. For half the full antenna gain (K = 15) the variation of the enhancement around the peak value (R = 458) is shown

| $\tau_{off}/\tau_{on}$ | $\Delta \overline{\sigma}$ | R |
|---|---|---|
| a. K = 30 and $\tau_{on}$ = 0.02 | | |
| 20 | 0.49 | 204 |
| 30 | 0.44 | 353 |
| 35 | 0.41 | 417 |
| 40 | 0.37 | 455 |
| 45 | 0.31 | 396 |
| 50 | 0.21 | 224 |
| b. K = 15 and $\tau_{on}$ = 0.03 | | |
| 16 | 0.42 | 399 |
| 17 | 0.41 | 424 |
| 18 | 0.40 | 445 |
| 19 | 0.38 | 458 |
| 20 | 0.36 | 452 |
| 21 | 0.34 | 439 |
| 22 | 0.31 | 397 |

FIGS 10(c) and 10(d) indicate the result of a trade-off study in which the antenna gain wa reduced by factors of 2 and 3 so that the area of each spot was $2A_O$ and $3A_O$, respectively. This of course, results in a reduction of the corresponding value of K. In the case presented in FIG. 10(c), the antenna gain is reduced by a factor of 2 so that K=15 and the area of each spot is $2A_O$. This case requires a longer $\tau_{on}$ to achieve significant heating of a spot and also the total number of spots that can be covered is reduced (Table Ib). Unlike Table Ia, which shows the enhancement for a wide range of $\tau_{off}/\tau_{on}$, Table Ib shows the sensitive dependence of R on $\tau_{off}/\tau_{on}$ around the case of maximum enhancement. FIG. 3(d) shows the case with K=10 where the maximum enhancement 524 in efficiency was achieved. In this case only 15 spots each with area $3A_O$ were heated. In all the three cases K=10, 15 and 30 shows in FIGS. 10(b), 10(c), and 10(d), enhancements 500 are easily achieved and the waveforms of y in these cases are similar to each other.

Figure 12:
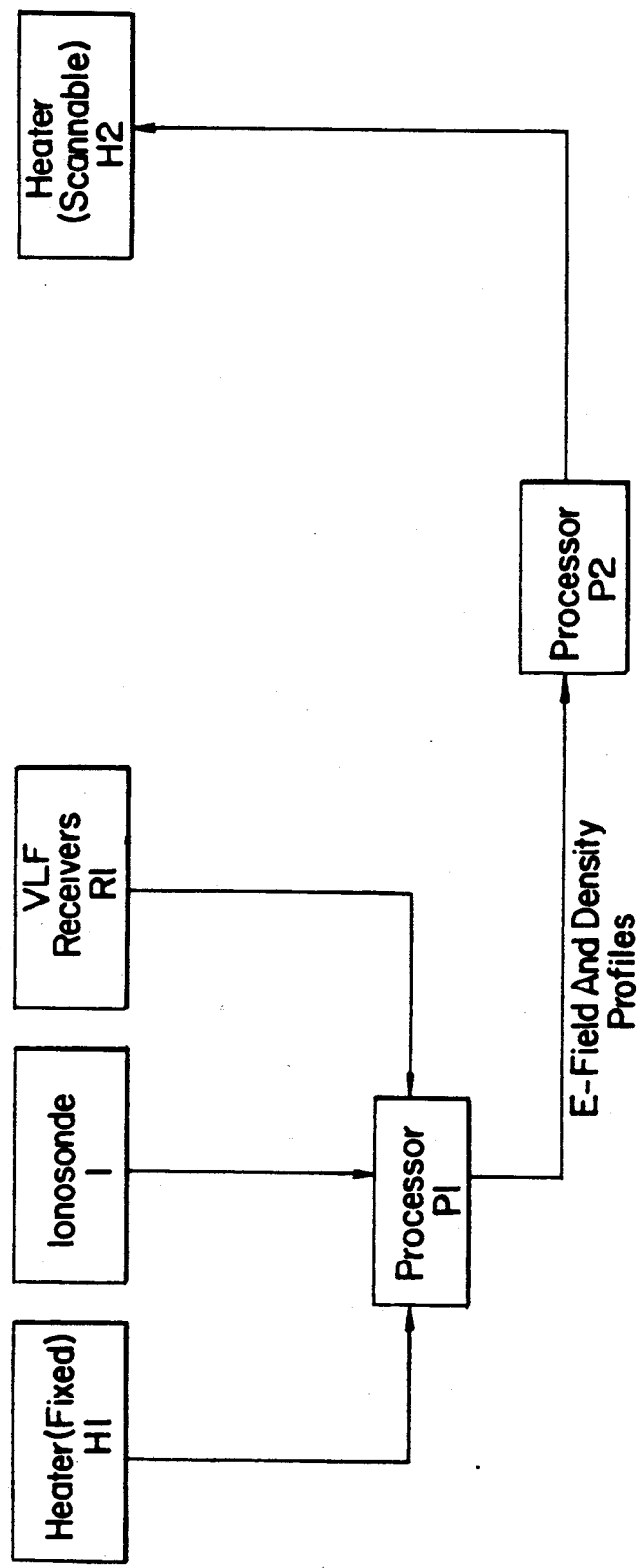
FIG. 12 is a schematic showing a system for continuous monitoring of ionospheric electric field and electron density profiles.

Optimum waveguide excitation efficiency occurs when the structure of the ELF fields generated in the ionosphere by the modulated HF heating matches the fields of the least damped eigenmode of the Earth-Ionosphere waveguide. For the frequencies considered here, the relevant mode is the TEM mode which is characterized by the presence of a propagating vertical electric field in the waveguide. By controlling the HF heater frequency and scanning antenna pattern, the coupling efficiency to the TEM mode of the waveguide can be optimized. To achieve this, good models of the ionospheric electric field and electron density profiles are required. The continuous monitoring of these quantitites in real time constitutes a further aspect of the invention. A schematic of how this is accomplished is shown in FIG. 12. An independent fixed HF heater (H1) with large bandwidth is modulated at a fixed VLF frequency in the range of 1–2 khz. The HF frequency is swept over its bandwidth on a few seconds times. The components of the electric and magnetic fields generated at the chosen VLF frequency are continuously monitored by a receiver (R1) and fed into a processor (P1). The data from a continuously operating inosonde (I) are also fed into the processor P1. Inverting the data from R1 and I, the processor P1 produces models of the ambient ionospheric electric field and the electron density profile. These are fed to another processor (P2) which determines the HF frequency and sweep pattern required to obtain optimum overall conversion efficiency. These are relayed to the ELF generating HF heater (H2) for implementation.

While specific embodiments of the invention have been described and illustrated, it will be clear that variations in the details of the embodiments specifically illustrated and described may be made without departing from the true spirit and scope of the invention as defined in the appended claims.

What is claimed is:

1. A method for causing interruptions in an ionospheric electrojet to produce ELF/VLF signals, the method comprising the steps of:
    generating an antenna beam with a high power transmitter which can be modulated in ELF and VLF frequency ranges;
    directing the antenna beam generated by the high power transmitter at a first location of earth atmosphere to cause heating of ionospheric electrons in a first location;
    sweeping the antenna beam over a region of earth atmosphere proximate to the first location at a rate faster than a rate of cooling of the first location thereby causing heating of ionospheric electrons in the proximate area.

2. The method recited in claim 1 wherein the antenna beam causes heating of a region of earth atmosphere at an altitude of about 90km.

3. The method recited in claim 1 wherein the transmitter transmits the antenna beam at a frequency of about 8 MHz.

4. The method recited in claim 1 wherein the region of earth atmosphere heated is at an altitude determined by a frequency of the antenna beam.

5. The method recited in claim 1 wherein a rate of the cooling of the first location decreases as an altitude of the first location increases.

6. The method recited in claim 1 comprising monitoring an electric field generated by the antenna beam and shaping the heating region to optimize a vertical component of the electric field.

7. The method recited in claim 6 comprising monitoring the electric field of 1-2 KHz waves 8. The method recited in claim 1 wherein the region proximate to the first location comprises a plurality of areas of earth atmosphere individually heated to form a substantially continuous heated region of earth atmosphere.

9. An apparatus for causing interruptions in an ionospheric electrojet to produce ELF/VLF signals comprising:
    a high power transmitter which can operate in ELF and VLF frequency ranges for generating an antenna beam;
    means for directing the antenna beam generated by the high power transmitter at a first location of earth atmosphere to cause heating of ionospheric electrons in the first location;
    means for sweeping the antenna beam over a region of earth atmosphere proximate to the first location at a rate faster than a rate of cooling of the first location thereby causing heating of ionospheric electrons in the proximate area.

10. The apparatus recited in claim 9 wherein the antenna beam causes heating of a region of earth atmosphere at an altitude of about 90km.

11. The apparatus recited in claim 9 wherein the transmitter transmits the antenna beam at a frequency of about 8 MHz.

12. The apparatus recited in claim 9 wherein the region of earth atmosphere heated is at an altitude determined by a frequency of the antenna beam.

13. The apparatus recited in claim 9 wherein a rate of the cooling of the first location decreases as an altitude of the first location increases.

14. The apparatus recited in claim 9 comprising means for monitoring an electric field generated by the antenna beam and means for shaping the heating region to optimize a vertical component of the electric field.

15. The apparatus recited in claim 14 comprising means for monitoring the electric field with 1-2 KHz waves.

* * * * *